(12) United States Patent
Yoshida

(10) Patent No.: US 7,613,903 B2
(45) Date of Patent: Nov. 3, 2009

(54) DATA PROCESSING DEVICE WITH INSTRUCTION TRANSLATOR AND MEMORY INTERFACE DEVICE TO TRANSLATE NON-NATIVE INSTRUCTIONS INTO NATIVE INSTRUCTIONS FOR PROCESSOR

(75) Inventor: Toyohiko Yoshida, Hyogo (JP)

(73) Assignee: Renesas Technology Corporation, Tokyo (JP)

( * ) Notice: Subject to any disclaimer, the term of this patent is extended or adjusted under 35 U.S.C. 154(b) by 1898 days.

(21) Appl. No.: 09/911,739

(22) Filed: Jul. 25, 2001

(65) Prior Publication Data

US 2002/0138712 A1 Sep. 26, 2002

(30) Foreign Application Priority Data

Jan. 22, 2001 (JP) ............................. 2001-012687

(51) Int. Cl.
  *G06F 9/30* (2006.01)
(52) U.S. Cl. ..................................................... 712/209
(58) Field of Classification Search ................ 712/227, 712/213, 209
  See application file for complete search history.

(56) References Cited

U.S. PATENT DOCUMENTS

| | | | | |
|---|---|---|---|---|
| 5,386,547 | A | * | 1/1995 | Jouppi .......................... 711/122 |
| 5,638,525 | A | * | 6/1997 | Hammond et al. ........... 712/209 |
| 5,784,585 | A | * | 7/1998 | Denman ....................... 712/209 |
| 5,881,258 | A | * | 3/1999 | Arya ............................ 712/209 |
| 6,292,883 | B1 | * | 9/2001 | Augusteijn et al. .......... 712/209 |

FOREIGN PATENT DOCUMENTS

| | | |
|---|---|---|
| EP | 0709767 | 5/1996 |
| JP | 9-26876 | 1/1997 |

OTHER PUBLICATIONS

Precision Mode Bit. IBM Technical Disclosure Bulletin. NN610843, Augustt 1, 1961.*
Hank Shiffman, "*JSTAR: Practical Java Acceleration For Information Appliances*", JEDI Technologies, Apr. 17, 2000.
Tom R. Halfhill, "*JSTAR Coprocessor Accelerates Java, Licensable Bytecode Translator Works With Almost Any Core*", Microprocessor Report, Mar. 27, 2000.
James L. Turley, "*Thumb Squeezes ARM Code Size, New Core Module Provides Optimized Second Instruction Set*", Microprocessor Report, vol. 9, No. 4, Mar. 27, 1995.

* cited by examiner

*Primary Examiner*—Eddie P Chan
*Assistant Examiner*—Jacob Petranek
(74) *Attorney, Agent, or Firm*—McDermott Will & Emery LLP

(57) ABSTRACT

A data processing device includes a processor core, and a memory interface portion arranged between the processor core and an external memory mapped into a predetermined external memory space. The memory interface portion includes a fetch circuit for receiving an address value for access to the external memory space from the processor core, and fetching the data at the address in the external memory, a translator for translating the nonnative instruction fetched from the external memory into the native instruction, and a select circuit for selectively applying the data read from the external memory space and the instruction prepared by translating the instruction read from the external memory space by the translator to the processor core depending on whether the address value for the access to the external memory space is in a predetermined region or not.

15 Claims, 18 Drawing Sheets

FIG. 5

|   | 0 | 170a | | | | | | | 170b | 7 | 8 | | | | | 15 |
|---|---|---|---|---|---|---|---|---|---|---|---|---|---|---|---|---|
|   | SM | 0 | 0 | 0 | 0 | 0 | 0 | 0 | IE | RP | MD | 0 | 0 | 0 | 0 | 0 |

|   | 16 | | 170c | | | 170d | | | 23 | 24 | | | | | | 31 |
|---|---|---|---|---|---|---|---|---|---|---|---|---|---|---|---|---|
|   | 0 | F0 | 0 | F1 | 0 | F2 | 0 | F3 | 0 | F4 | 0 | F5 | 0 | F6 | 0 | F7 |

- SM: Stack mode
  SM=0 Interrupt mode. SPI is used.
  SM=1 User mode. SPU is used.
- IE: Interrupt enable
  IE=0 Interrupts are masked.
  IE=1 Interrupts are accepted.
- RP: Repeat enable
  RP=0 A block repeat is inactive.
  RP=1 A block repeat is active.
- MD: Modulo enable
  MD=0 Modulo addressing is disabled.
  MD=1 Modulo addressing is enabled.
- F0 : Execution control flag #0
- F1 : Execution control flag #1
- F2 : General flag
- F3 : General flag
- F4(S) : Saturation flag
- F5(V) : Overflow flag
- F6(VA) : Accumulated Overflow flag
  VA is cleared by a reset interrupt and MVTSYS instruction.
- F7(C) : Carry/Borrow flag

FIG. 10

|  | 0 | 7 | 9 | 15 | 21 | 27 |
|---|---|---|---|---|---|---|
| Short_M | opcode | X | Ra | Rb | src | |
| Short_A | opcode | Y 0 | Ra | Rb | src | |
| Short_B1 | opcode | 0 0 | 0 | 0 | Rc | |
| Short_B2 | opcode | 1 0 | disp:18 | | | |
| Short_B3 | opcode | F Z | Ra | src | | |
| Short_D1 | opcode | F 0 | Ra | src | | |
| Short_D2 | opcode | F 0 | ct:6 | src | | |

Short_M — 211
Short_A — 212
Short_B1 — 213
Short_B2 — 214
Short_B3 — 215
Short_D1 — 216
Short_D2 — 217

X=00=> src= Rc
X=01=> src= Rc ; Rb++
X=11=> src= Rc ; Rb--
X=10=> src= imm:6
Y=0=> src= Rc
Y=1=> src= imm:6

F=0=> src= Rc
F=1=> src= imm:12
Z=0=> test for zero
Z=1=> test for not zero

| 0 | 7 | 9 | 15 | 21 22 | 26 31 36 | 43 46 | 53 63 |
|---|---|---|---|---|---|---|---|
| opcode | 1 0 | Ra | Rb | | imm:32 | | |

Long — 218

DATA PROCESSING DEVICE WITH INSTRUCTION TRANSLATOR AND MEMORY INTERFACE DEVICE TO TRANSLATE NON-NATIVE INSTRUCTIONS INTO NATIVE INSTRUCTIONS FOR PROCESSOR

BACKGROUND OF THE INVENTION

1. Field of the Invention

The present invention relates to a data processing device with an instruction translator for translating instructions not native to a certain processor into instructions native to the same processor, and can rapidly execute a program including a processing routine formed of nonnative instructions and a processing routine formed of native instructions in a mixed fashion. The invention also relates to a memory interface device for such a data processing device.

2. Description of the Background Art

There is a close relationship between a processor architecture and a system of instructions that can be executed on such a processor. If the instruction set is updated in accordance with advance of the processor architecture, those program codes written for the old processors designed in accordance with the old instruction sets will usually be impossible to execute. What is most important is how the programs implemented in accordance with the old instruction set will be effectively inherited. For this purpose, many techniques have been developed for executing the programs, which were written for old processors designed in accordance with the old instruction set, by new processors having a certain instruction set.

One of the typical conventional schemes for executing the program written for the old processor on a new processor, is to provide hardware of the new processor with a function of the old processor. Referring to FIG. 1, a conventional data processing device for performing such a method includes a processor 1 provided with a multifunction instruction decoder 5, which has functions of decoding both the instructions for the old processor and the instructions for the new processor, and an arithmetic portion 6 having a function of executing these instructions. The data processing device further includes a bus 4 connected to processor 1 as well as a data memory 2 and an instruction memory 3, which are connected to bus 4.

Instruction memory 3 holds both the instructions of the old processor and the instructions of the new processor. Multifunction instruction decoder 5 decodes instructions read from instruction memory 3 and transferred to processor 1 via bus 4. Multifunction instruction decoder 5 has the function of decoding both the instructions for the new processor and the instructions for the old processor. Execution portion 6 executes the decoded instruction. Data memory 2 can be accessed from both the instruction for the new processor and the instruction for the old processor.

Examples of the technique, in which the function of hardware of the old processor is given to the hardware of new processor, have been described in various books and magazines primarily for the developers, and reference can be made on them for more information.

In addition, the conventional methods for executing the programs for the old processor on the new processor includes one wherein the software for the old processor is first translated into software for the new processor and then executed, and one wherein the operations of instructions for the old processor are emulated by the software running on the new processor. These methods are likewise described in various books and magazines primarily for developers, and reference can be made on them for more information.

In some other cases, it may also be effective to execute the program written for a certain instruction set by the processor designed in accordance with another instruction set. For example, the program size can be reduced by defining a subset of a certain instruction set and writing a program in the subset. JAVA™ language is designed such that programs are written for an instruction set prescribed for a virtual processor, and a different kinds of processors execute the same program thus written by using instruction sets of the each processor. Therefore, the program written in the JAVA language can be commonly executed by multiple kinds of processors of different instruction sets.

There have been proposed many methods, in which the subjects of instruction sets are prepared for reducing the program size, and both the instructions of the non-reduced instruction set and the instructions of the reduced instruction set are decoded by a multifunction instruction decoder of a processor. For example, reference may be made to "Thumb Squeezes ARM Code Size (New Core Module Provides Optimizes Second Instruction Set)" by James L. Turley (Micro Processor Report, Vol. 9, No. 4, pp. 1 and 6-9, Mar. 27, 1995).

However, the conventional methods described above all suffer from the following problems.

If the function of executing the program written in the plurality of instruction sets are given to hardware of the processor, the hardware becomes complicated, and have increased sizes. For adding or changing an instruction set to be executed, the whole hardware must be redesigned, and it is difficult to deal with such addition and change with flexibility.

The following problem arises when changing or translating the program by the software. For translating the program itself, a memory of a large capacity is additionally required for holding the translated program. This increases costs of the memory and therefore the data processing device. In the case of emulating the operation of instructions with the instructions of another instruction set, it is naturally necessary to emulate the operation results, and further it is necessary to emulate values of program counters and, if necessary, flags. For this reason, it is necessary to replace the operation of one instruction with many instructions of another set. This significantly lowers the operation speed.

SUMMARY OF THE INVENTION

An object of the invention is to provide a data processing device, which can rapidly execute a program formed of instructions in a plurality of different instruction sets, using native instructions, without changing hardware itself of a processor core, and does not require a memory of a large capacity, as well as a memory interface device provided with an instruction translator for the same.

A data processing device according to an aspect of the invention includes a processor core, and a memory interface portion arranged between the processor core and an external memory mapped into a predetermined external memory space. The memory interface portion includes a fetch circuit for receiving an address value for access to the external memory space from the processor core, and fetching the data at the address in the external memory. This data is an instruction nonnative or native to the processor, or data to be processed. The memory interface portion further includes a translator for translating the instruction nonnative to the processor core fetched by the fetch circuit from the external memory into a native instruction or native instructions, and a select circuit for selectively applying the data read from the external memory space and the instruction or instructions prepared by translating the instruction read from the external memory space by the translator to the processor core depending on whether the address value for the access from the processor core to the external memory space is in a predetermined region or not.

A memory interface device according to another aspect of the invention is a device arranged between a processor core and an external memory mapped into a predetermined external memory space, and includes a fetch circuit for receiving an address value for access to the external memory space from the processor core, and fetching the data at the address in the external memory. This data is an instruction nonnative or native to the processor, or data to be processed. The data interface device further includes a translator for translating the nonnative instruction for the processor core fetched by the fetch circuit from the external memory into a native instruction or native instructions, and a select circuit for selectively applying the data read from the external memory space and the instruction prepared by translating the instruction read from the external memory space by the translator to the processor core depending on whether the address value for the access from the processor core to the external memory space is in a predetermined region or not.

A data reading method according to still another aspect of the invention is a method of reading data from an external memory mapped into a predetermined external memory space to a processor core, and includes a step of receiving an address value for access from the processor core to the external memory space, and fetching the data at the address in the external memory. This data is an instruction nonnative or native to the processor, or data to be processed. The method further includes a step of translating the instruction nonnative to the processor core fetched from the external memory into a native instruction or native instructions, and a step of selectively applying the data read from the external memory space and the instruction prepared by the translation of the instruction read from the external memory space to the processor core depending on whether the address value for the access from the processor core to the external memory space is in a predetermined region or not.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 schematically shows a control register 170 in processor 510;

FIG. 10 shows formats of sub-instructions of the VLIW instruction executable by processor 510;

DESCRIPTION OF THE PREFERRED EMBODIMENTS

Figure 1:
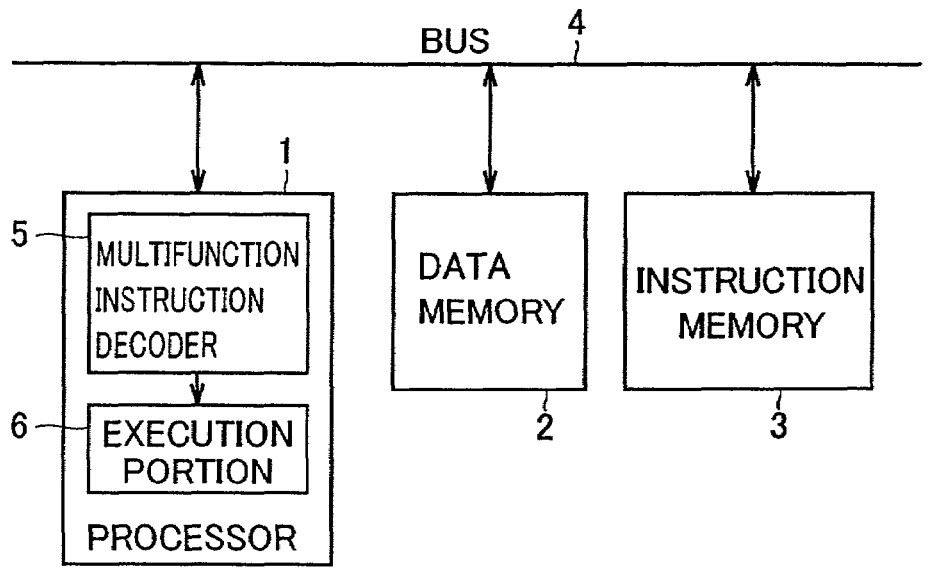
FIG. 1 is a schematic block diagram of a data processing device provided with a conventional old instruction emulation function.
Figure 2:
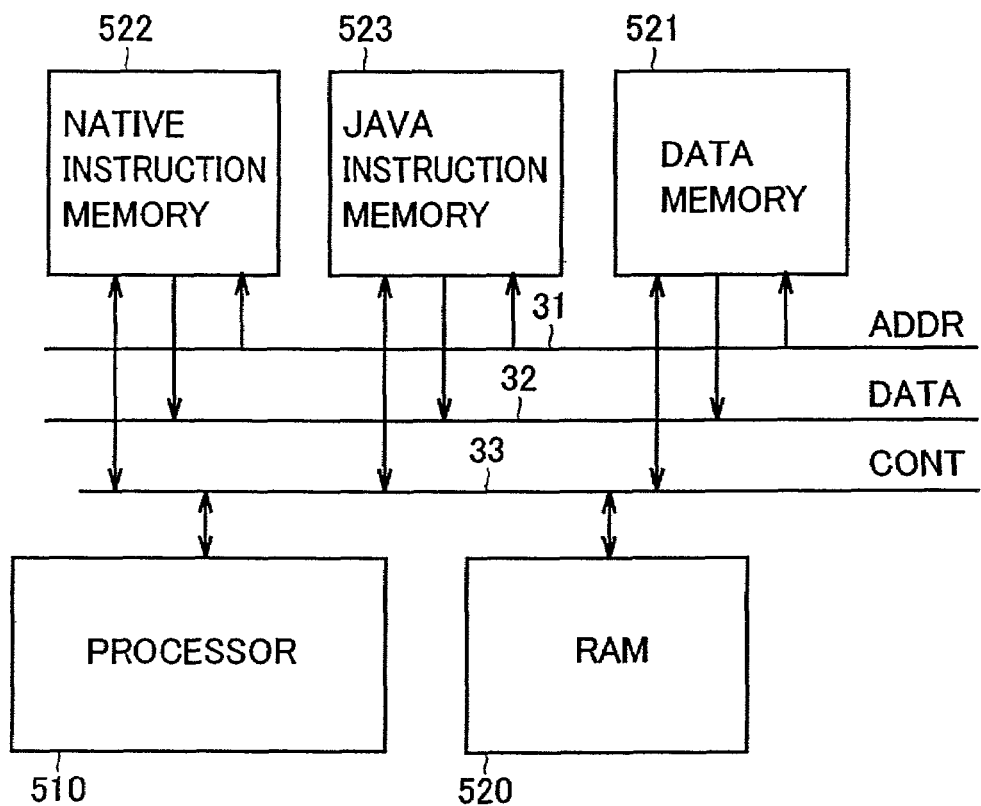
FIG. 2 is a block diagram of a data processing device provided with an instruction translator function of a first embodiment of the present invention.

Referring to FIG. 2, a data processing device of an embodiment of the present invention includes a processor 510 formed on a semiconductor integrated circuit as well as an address bus 31, a data bus 32 and a control bus 33 each connected to processor 510. The data processing device also includes a data memory 521, a native instruction memory 522, a JAVA instruction memory 523 and a RAM (Random Access Memory) 520 each connected to address bus 31, data bus 32, and control bus 33.

Figure 3:
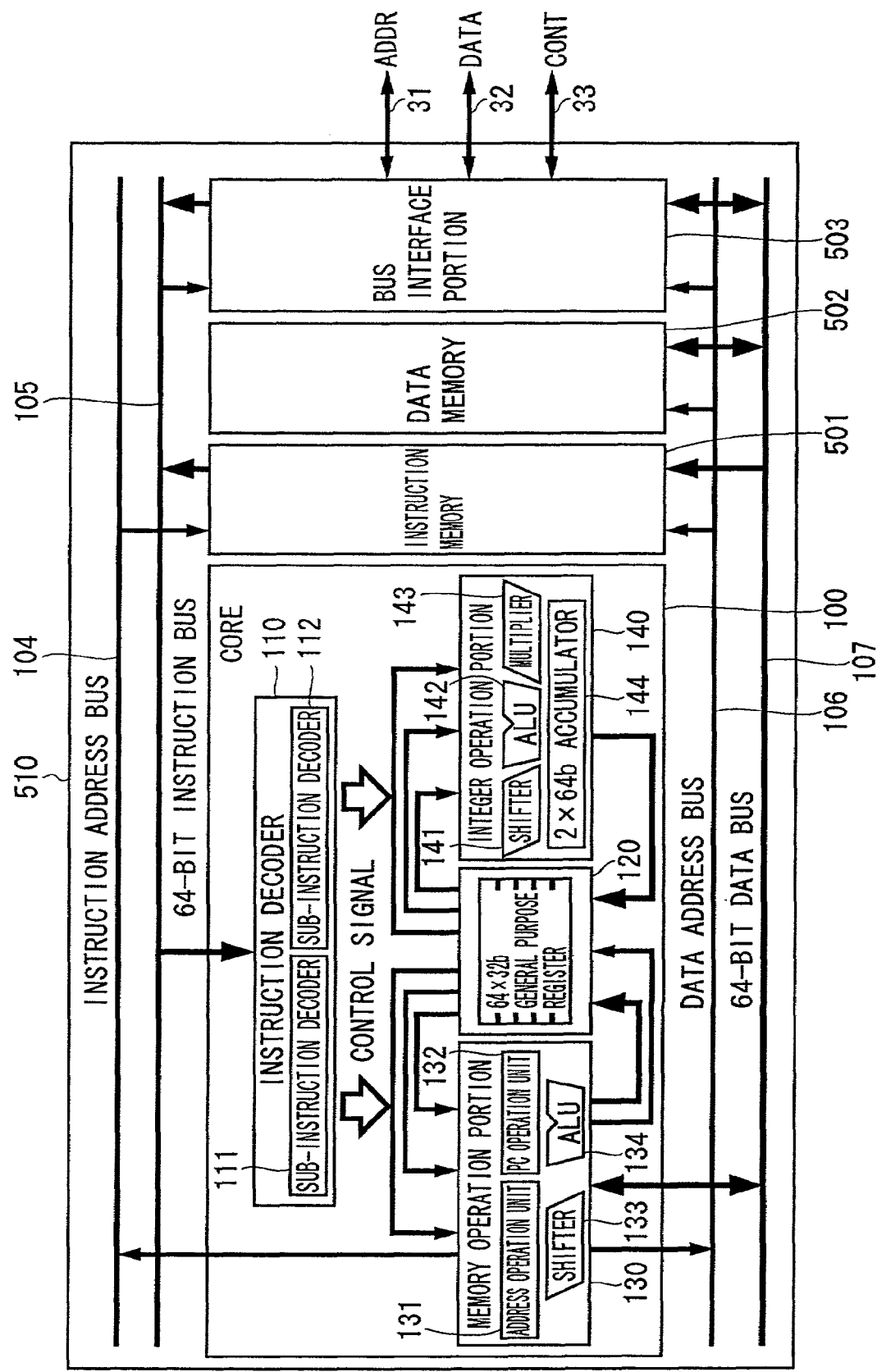
FIG. 3 is a block diagram of a processor 510 shown in FIG. 2.

Referring to FIG. 3, processor 510 is formed of one chip of a semiconductor integrated circuit, and includes a processor core 100, an instruction memory 501, a data memory 502, and a bus interface portion 503 connected to address bus 31, data bus 32 and control bus 33 as well as a data address bus 106 and a data bus 107, which interconnect the above memories, portions and others for transmitting addresses and data. Processor 510 also includes an instruction address bus 104 and an instruction bus 105 of 64-bit width, which are employed for interconnecting core 100, instruction memory 501 and bus interface portion 503.

Core 100 is a processor core having a VLIW (Very Long Instruction Word) type instruction set. Core 100 includes an instruction decoder 110 for decoding a VLIW instruction sent from instruction bus 105 as well as a memory operation portion 130 and an integer operation portion 140, which are employed for executing instructions decoded by instruction decoder 110. Core 100 also includes a general purpose register file 120, which is connected via a plurality of buses to memory and integer operation portions 130 and 140 for reading and writing by software.

Instruction decoder 110 includes two sub-instruction decoders 111 and 112.

Memory operation portion 130 includes operation units such as an address operation unit 131, a PC (Program Counter) operation unit 132, a shifter 133 and an ALU (Arithmetic Logic Unit) 134. Memory operation portion 130 is employed for executing the memory access instruction, PC control instruction, integer arithmetic operation instruction and others in accordance with the output of sub-instruction decoder 111. Integer operation portion 140 includes a shifter 141, an ALU 142, a multiplier 143 and an accumulator 144. Integer operation portion 140 is employed for executing the integer arithmetic operation instruction in accordance with the output of sub-instruction decoder 112. Memory operation portion 130 and integer operation portion 140 can execute two sub-instructions in parallel, and can also operate in such a manner that each execute one sub-instruction independently of the other.

Figure 4:
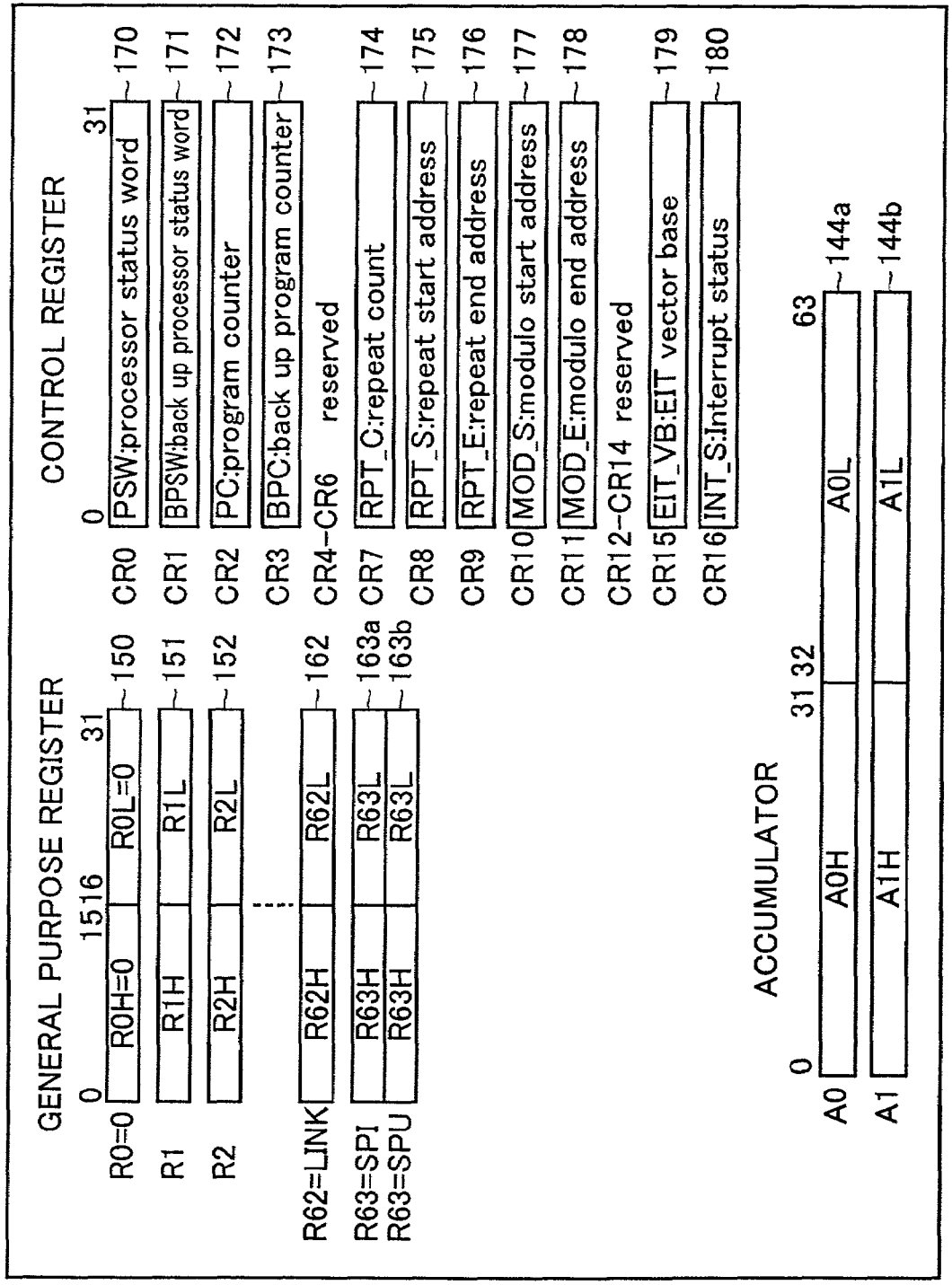
FIG. 4 shows, in a table format, registers provided in processor 510.

Referring to FIG. 4, register file 120 employed in processor 510 includes 64 registers 150-152, . . . , 162 and 163, which are 32-bit general purpose registers, respectively. Register 163 is used in two manners, and therefore is depicted as registers 163a and 163b for the sake of convenience. Processor 510 further includes control registers 170-180. Accumulator 144 shown in FIG. 3 includes two 64-bit accumulators 144a and 144b.

Register 150 is a register always holding zero. Register 162 is employed for holding data on a stack top during non-interrupt processing. Register 163b is a stack pointer during non-interrupt processing for holding the address of data immediately under the stack top.

Register 163 is switched at a mode bit within a control register 170, which is a PSW (Processor Status Word), so that it is selectively used as register 163a during the interrupt processing, and is used as register 163b during the non-interrupt processing.

Control registers 170-180 are dedicated to predetermined components or elements, respectively. Control register 170 is a PSW, and includes mode bits representing flags, which change depending on the operation, whether the interrupt is being performed or not, whether interrupt is masked or not, whether it is in the debugging mode or not, and others. Control register 172 is a program counter (PC), and represents an address of the instruction being executed. Control registers 171 and 173 are employed for copying and holding values of control registers 170 and 172 at the times of interrupt, exception and a trap, respectively. Other functions and others of the control registers are shown in FIG. 4, but are not specifically described for the simplicity reason, because these are not significantly related to the present invention.

Accumulators 144a and 144b are employed for holding results of multiplication and product-sum operation. Each of accumulators 144a and 144b can hold data of 64 bits, which are equal to double the bit length of the general purpose registers.

Referring to FIG. 5, the PSW held by control register 170 is formed of 32 bits, and includes an SM bit 170a, which is a mode bit indicating whether the current processing is interrupt processing or non-interrupt processing, an IE bit 170b indicating whether interruption is being allowed or inhibited, and F0 and F1 bits 170c and 170d controlling conditions of instruction execution. In addition to the above, control register 170 includes an RP bit, an MD bit and F2-F7 bits. Meanings of these bits are shown in FIG. 5. During the interruptible state, processor 150 accepts the interruption at a break between the VLIW instructions when an interrupt request is externally applied thereto.

Figure 6:
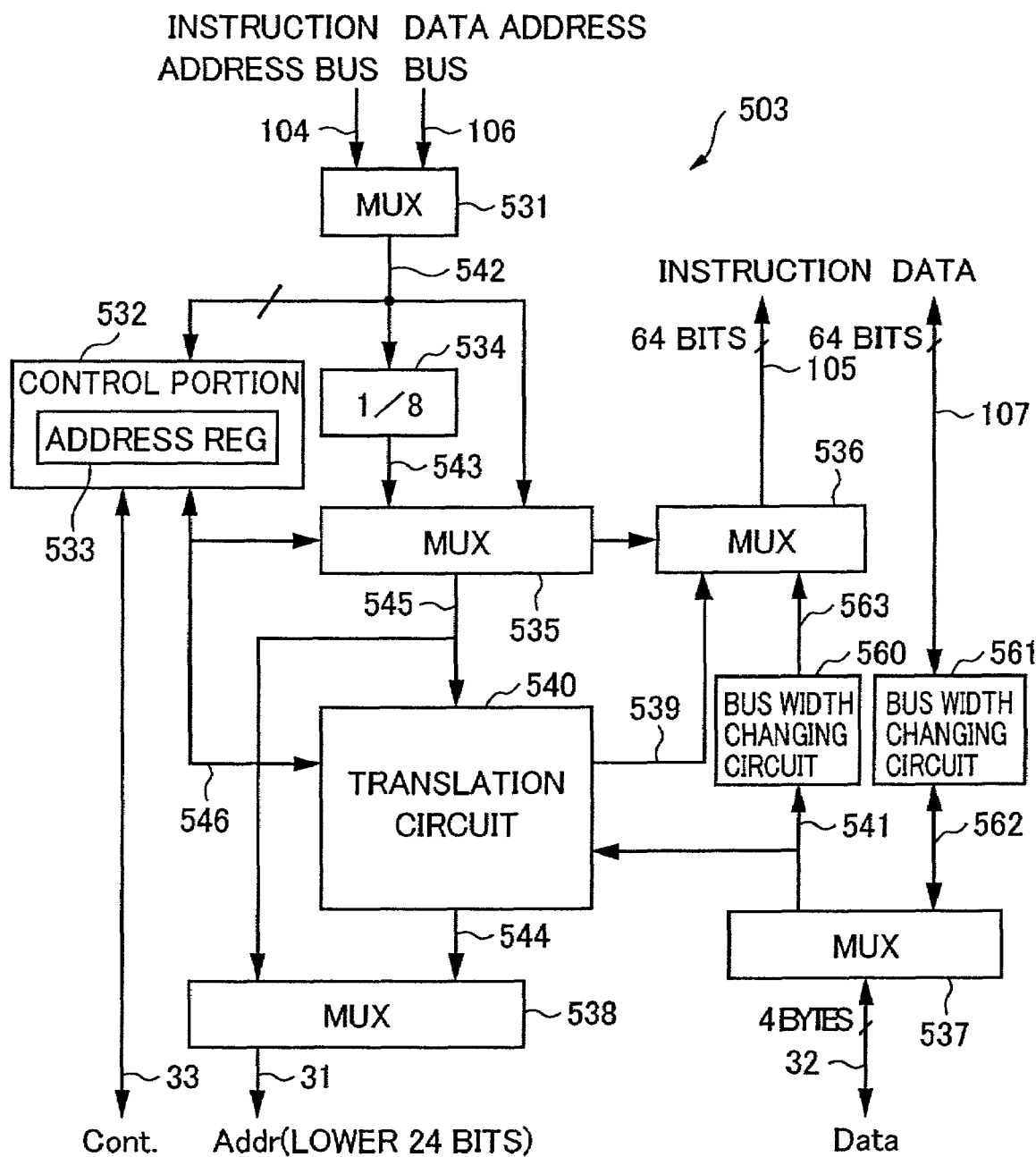
FIG. 6 is a block diagram of a bus interface portion 503 in processor 510.

Referring to FIG. 6, a bus interface portion 503 of processor 510 includes a translation circuit 540 for translating JAVA byte codes into a native instruction or native instructions by a hardware (which may also be referred to as "HW" hereinafter) translator, i.e., a hardware circuit, a control portion 532 which is connected to control bus 33 for controlling the HW translation and the access to memories 520-523 of processor 510, and has an address register 533, a selector 531 which has two inputs connected to instruction address bus 104 and data address bus 106, respectively, and an output connected to a signal line 542, an address signal shift circuit 534 which divides the address on signal line 542 by 8, and thus performs a right shift thereof by 3 bits for outputting the result onto a signal line 543, and a selector 535 which has two inputs connected to signal lines 543 and 542, respectively, and an output connected to a signal line 545, and is controlled by signals applied from translation circuit 540 and control portion 532 via a signal line 546.

Bus interface portion 503 further includes: a selector 538 having two inputs connected to a signal line 544 connected to the output of the translation circuit and a signal line 545, respectively, and an output connected to lower 24 bits of address bus 31; a selector 537 which has two terminals on the select side and connected to a signal line 562 and signal line 541 of 4-byte width, respectively, and one terminal connected to data bus 32 of 4-byte width, and has a function of outputting the input sent from data bus 32 selectively onto signal lines 541 and 542, and selecting the data on signal line 562 for outputting it onto data bus 32; a bus width changing circuit 560 which has an input connected to signal line 541 and an output connected to signal line 563; a selector 536 having two inputs connected to an output line 539 extending from translation circuit 540 and a signal line 563 of 8-byte width extending from bus width changing-circuit 560, respectively, and output connected to instruction bus 105; and a bus width changing circuit 561 having two I/O terminals connected to a signal line 562 of 4-byte width and a data bus 107 of 64-bit width.

Signal line 541 is also connected to the input of translation circuit 540. Signal line 542 is also connected to control portion 532.

Control portion 532 determines whether the address value sent from MUX 531 falls within a predetermined address region, and controls selectors 535, 538 and 536 in accordance with the determination. This predetermined address region corresponds to an address region 573 in FIG. 13, which will be described later. When control portion 532 receives the address value falling within the predetermined address region, it controls selector 535 to select signal line 543 so that the address value on signal line 543, which is prepared by 3-bit right shift of the address value on signal line 542 by shift circuit 534, is output onto signal line 545. Otherwise, the control portion 532 controls selector 535 to select signal line 542 and output the address value on signal line 542 onto signal line 545. When control portion 532 receives the address value falling within the predetermined address region, it controls selector 536 to select signal line 539 and output the instruction on signal line 539 (i.e., the native instruction prepared by translating the nonnative instruction by translation circuit 540) onto signal line 105. Otherwise, control portion 532 controls selector 536 to select signal line 563 and output the instruction (native instruction) on signal line 541 onto signal line 105. When the control portion 532 receives the address value falling within the predetermined address region, it controls selector 538 to select signal line 544 and output the address value on signal line 544 onto signal line 31. Otherwise, it controls selector 538 to select signal line 545 and output the address value on signal line 545 onto signal line 31.

When accessing the memory, processor core 100 outputs a control signal indicating whether the memory access is to be performed for an instruction designated by an instruction address or for data to be designated by a data address. Selector 531 is controlled by this control signal, and thereby selects signal line 104 to output the address value on signal line 104 onto signal line 543 when the access is to be performed for the instruction. When the access is to be performed for the data, selector 531 selects signal line 106, and outputs the address value on signal line 106 onto signal line 542. Selector 537 is likewise controlled by this control signal. Thereby, selector 537 selects signal line 541, and electrically connects signal line 32 to signal line 541 when the access is to be performed for the instruction. When the access is to be performed for the data, selector 537 selects signal line 562, and connects it to signal line 107.

Figure 7:
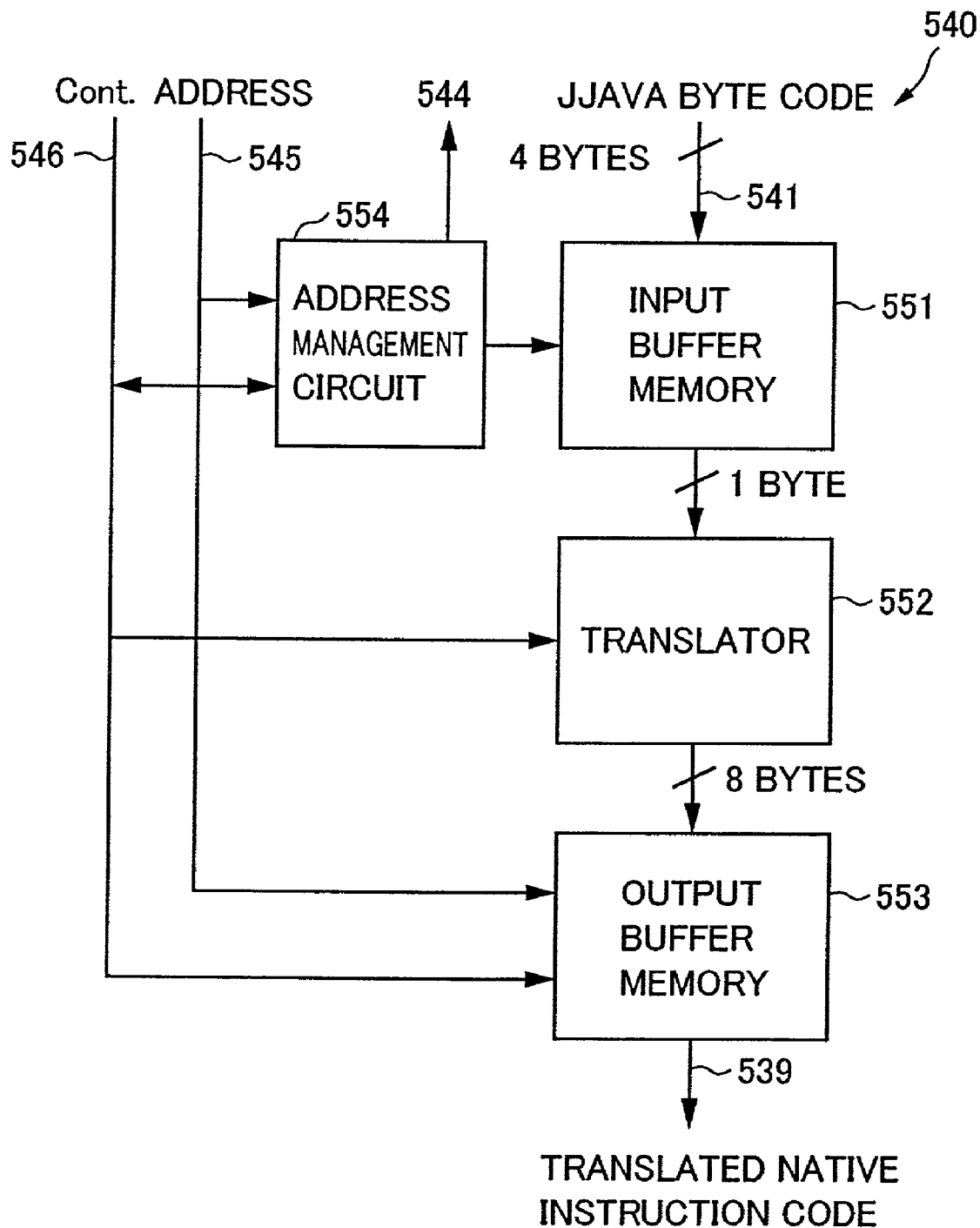
FIG. 7 is a block diagram of a translation circuit 540 in a bus interface circuit 503.

Referring to FIG. 7, translation circuit 540 includes: an input buffer memory 551 for temporarily storing the JAVA byte codes, which are fetched four bytes at a time (i.e., corresponding to the width of data bus 32) via signal line 541 from memory 523; a translator 552 which performs one-byte translation of the JAVA byte code applied from input buffer memory 551, and thereby outputs one native instruction of 8 bytes; an output buffer memory 553 which receives the output of translator 552 as well as the address and control signals sent from signal lines 545 and 546, and temporarily stores the native codes sent from translator 552 for outputting them onto signal line 539; and an address managing circuit 554 which is connected to signal lines 544, 545 and 546 for managing the address input from selector 535 via signal line 545.

Figure 8:
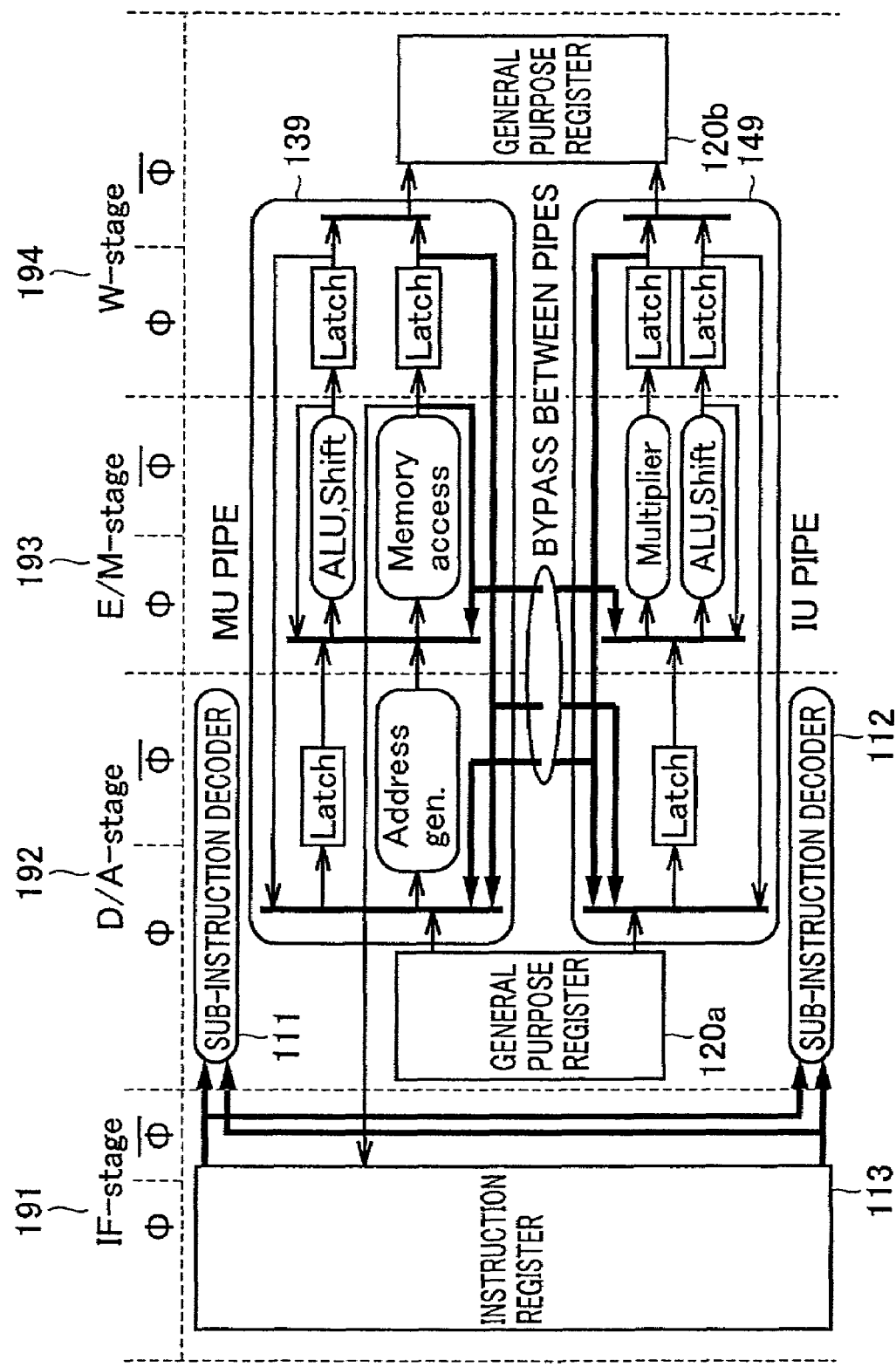
FIG. 8 shows a pipeline processing mechanism of processor 510.

Referring to FIG. 8, processor 510 performs the pipeline processing on instructions in the following manner. Processor 510 functionally includes an MU pipe 139 and an IU pipe 149 for executing sub-instructions, which are executed by memory operation portion 130 and integer operation portion 140, respectively. Each of pipes 139 and 149 is formed of an instruction fetch stage 191, a decode and address calculating stage 192, an operation and memory access stage 193, and a write-back stage 194.

Instruction fetch stage 191 fetches the instruction and holds it in instruction register 113 of instruction decoder 110. In decode and address calculating stage 192, the instruction thus held is decoded by sub-instruction decoders 111 and 112, and simultaneously register file 120 (represented as register file 120a for clarifying that it is on input) is accessed and the address calculation of the operand and PC is performed. In the operation and memory access stage 193, integer operation and data memory access processing are performed. In a write-back stage 194, the operation result and the data fetched from the memory are rewritten into register file 120 (represented as register file 120b for clarifying that it is on the output side).

Figure 9:
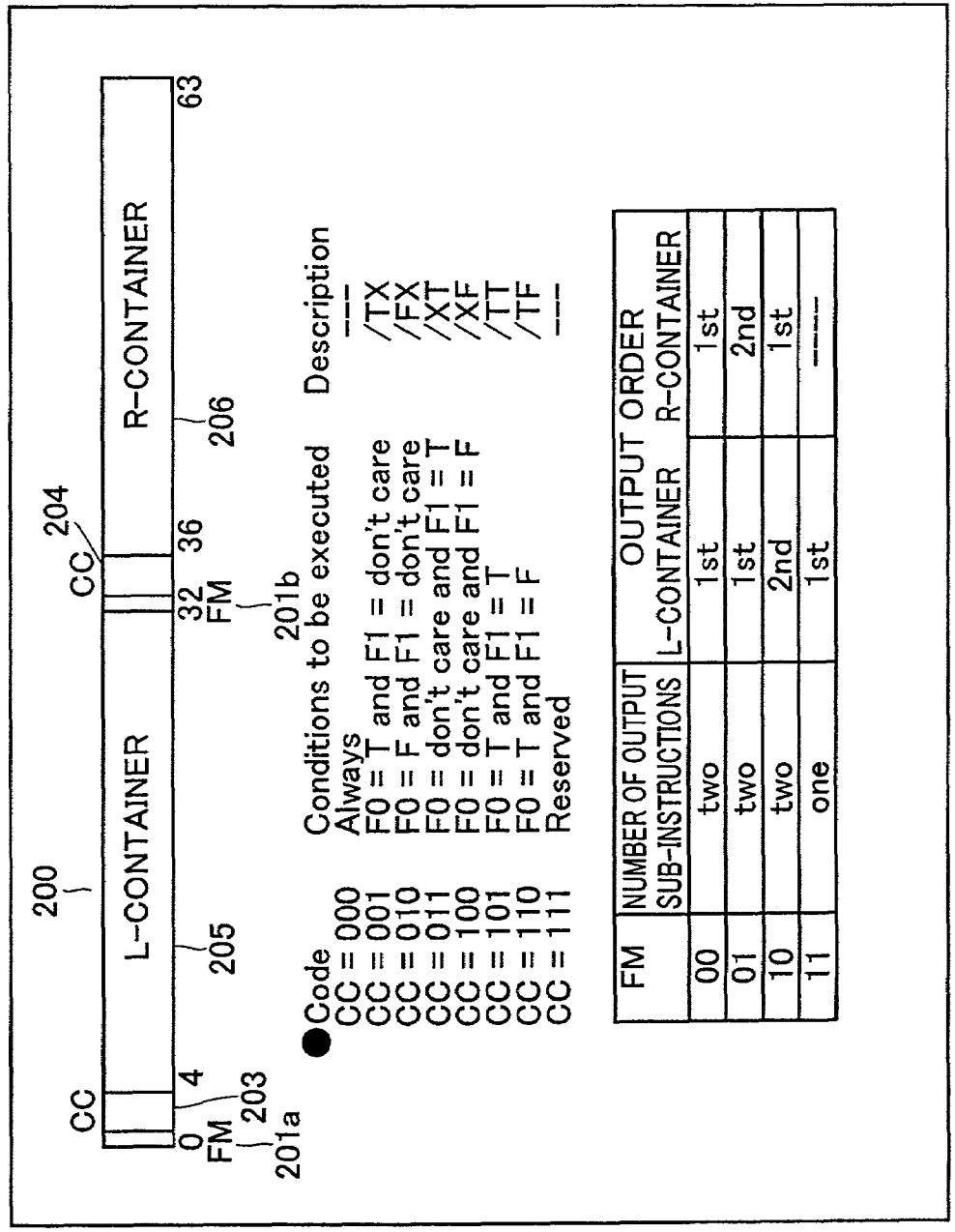
FIG. 9 shows a format of a VILW (Very Long Instruction Word) instruction executable by processor 510.

Referring to FIG. 9, an instruction 200 of processor 510 is a two-way VLIW type instruction, and has a format shown in FIG. 9. More specifically, instruction 200 includes FM fields 201a and 201b for defining an execution order of respective sub-instructions and defining long sub-instructions L- and R-containers 205 and 206 for storing the sub-instructions, and condition (CC) fields 203 and 204 for specifying the execution conditions of the respective sub-instructions.

The condition fields 203 and 204 specify the conditions depending on the values of flags F0 and F1 (F0 bit 170c and F1 bit 170d) in the PSW (i.e., control register 170). For example, when condition field 203 is "000", the sub-instruction contained in L-container 205 is executed unconditionally. When the condition field 204 is "101", the sub-instruction included in R-container 206 is executed if F0 (F0 bit 170c) is equal to 1 and F1 (F1 bit 170d) is equal to 1, and otherwise is invalidated.

FM fields 201a and 201b designate the execution operation for executing the sub-instructions contained in L- and R-containers 205 and 206. There are four execution operations. The first operation is to execute in parallel the sub-instructions included in L- and R-containers 205 and 206. The second operation is to execute the sub-instruction of L-container 205, and thereafter execute the sub-instruction of R-container 206. The third operation is opposite to the second operation so that the sub-instruction of R-container 206 is first executed, and then the sub-instruction of L-container 205 is executed. The fourth execution operation is to execute one long sub-instruction divided and held by L- and R-containers. More specifically, one of the foregoing four operations is selected depending on the values of FM fields 201a and 201b.

Referring to FIG. 10, the sub-instructions held in L- and R-containers 205 and 206 have the following formats. The sub-instructions are classified into short instructions of 28 bits in length and long sub-instructions of 54 bits in length. The short sub-instructions have seven kinds of formats indicated by 211-217, respectively. In summary, according to the format of the short sub-instructions, bit positions 0-9 indicate the kind of operation, and bit positions 10-27 indicate up to three operands. In the long sub-instructions, as indicated by format 218, bit positions 0-9 indicate the kind of operation, and bit positions 10-53 indicate up to three operands including an immediate value data of a 32-bit length. The immediate value of 32 bits of the long sub-instruction is held in VLIW instruction bit positions 26-31, 36-43 and 46-63.

Format 211 is of the sub-instruction for performing the memory access operation (load/store operation). Format 212 is of the sub-instruction for performing an operation between operands held by general purpose registers (OP operation). Formats 213-217 are of the sub-instructions for performing the branch operations. Format 218 of the long sub-instruction is commonly used by all of the three kinds of operations.

Figure 11:
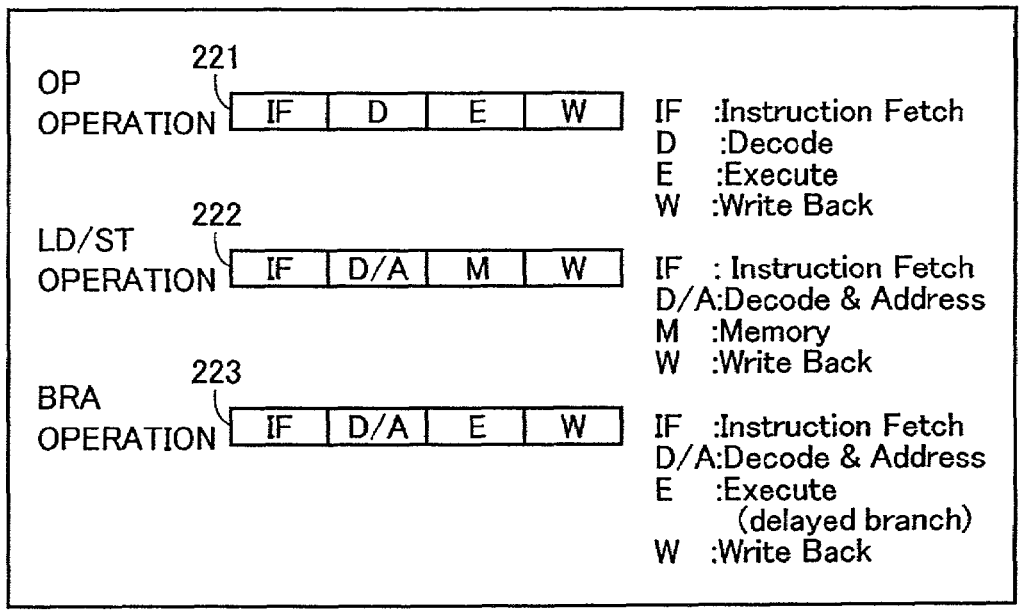
FIG. 11 shows how a sub-instruction is pipeline-processed by processor 510.

When processor 510 performs the pipeline processing on the sub-instructions as shown in FIG. 8, the sub-instructions of the OP operation, load/store operation and branch operation are executed on four pipeline stages as indicated by four pipelines 221-223 in FIG. 11. These stages correspond to the four stages shown in FIG. 7, respectively.

Figure 12:
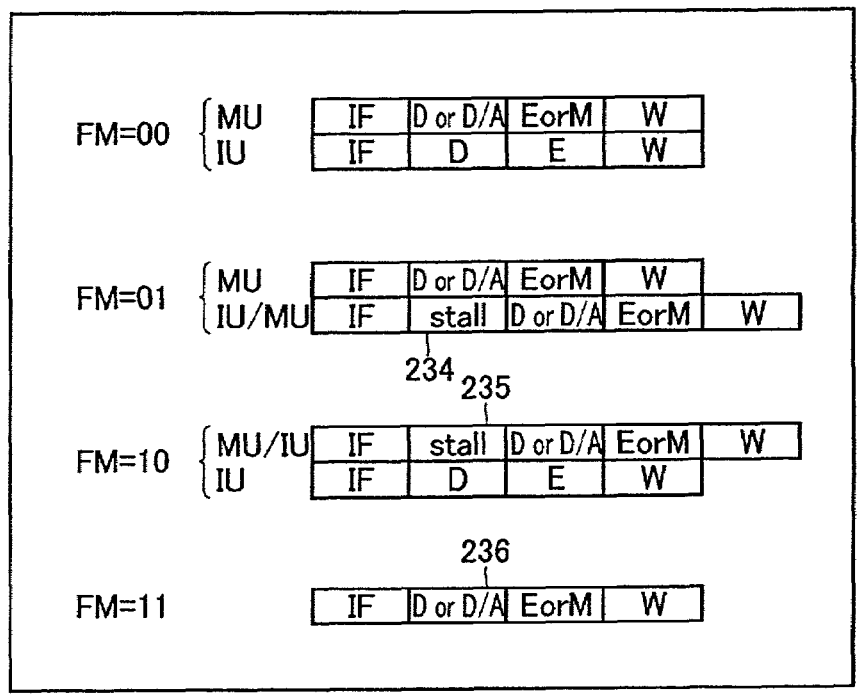
FIG. 12 shows how two sub-instructions are pipeline-processed by processor 510.

When FM fields 201a and 201b designate the execution order of the sub-instructions, the pipeline processing is effected on the sub-instructions by MU and IU pipes 139 and 149 as shown in FIG. 12. Stall stages 234-236 are to be inserted for delaying execution of one of the sub-instructions in case the sub-instructions are executed in the order determined by the values of FM fields 201a and 201b.

The sub-instructions defined with respect to processor 510 are shown in the following list. In the list, mnemonics of the respective sub-instructions are represented in upper cases, and the processing contents thereof are described on the right of the respective mnemonics.

| Load/Store Instructions | |
|---|---|
| LDB | Load one byte to a register with sign extension |
| LDBU | Load one byte to a register with zero extension |
| LDH | Load one half-word to a register with sign extension |
| LDHH | Load one half-word to a register high |
| LDHU | Load one half-word to a register with zero extension |
| LDW | Load one word to a register |
| LD2W | Load two words to registers |
| LD4BH | Load four bytes to four half-word registers with sign extension |
| LD4BHU | Load four bytes to four half-word registers with zero extension |
| LD2H | Load two half-words to registers |
| STB | Store one byte from a register |
| STH | Store one half-word from a register |
| STHH | Store one half-word from a register high |
| STW | Store one word from a register |
| ST2W | Store two words from registers |
| ST4HB | Store four bytes from four half-word registers |
| ST2H | Store two half-words from registers |
| MODDEC | Decrement a register value by a 5-bit immediate value |
| MODINC | Increment a register value by a 5-bit immediate value |
| Transfer instructions | |
| MVFSYS | Move a control register to a general purpose register |
| MVTSYS | Move a general purpose register to a control register |

-continued

| | |
|---|---|
| MVFACC | Move a word from an accumulator |
| MVTACC | Move two general purpose registers to an accumulator |

Compare instructions

| | |
|---|---|
| CMPcc | Compare |
| | cc = EQ(000), NE(001), GT(010), GE(011), LT(100), LE(101), PS-both positive (110), NG-both negative (111) |
| CMPUcc | Compare unsigned |
| | cc = GT(010), GE(011), LT(100), LE(101) |

Arithmetic operation instructions

| | |
|---|---|
| ABS | Absolute |
| ADD | Add |
| ADDC | Add with carry |
| ADDHppp | Add half-word |
| | ppp = LLL(000), LLH(001), LHL(010), LHH(011), HLL(100), HLH(101), HHL(110), HHH(111) |
| ADDS | Add register Rb with the sign of the third operand |
| ADDS2H | Add sign to two half-words |
| ADD2H | Add two pairs of half-words |
| AVG | Average with rounding towards positive infinity |
| AVG2H | Average two pairs of half-words rounding towards positive infinity |
| JOINpp | Join two half-words |
| | pp = LL(00), LH(01), HL(10), HH(11) |
| SUB | Subtract |
| SUBB | Subtract with borrow |
| SUBHppp | Subtract half-word |
| | ppp = LLL(000), LLH(001), LHL(010), LHH(011), HLL(100), HLH(101), HHL(110), HHH(111) |
| SUB2H | Subtract two pairs of half-words |

Logical operation instructions

| | |
|---|---|
| AND | logical AND |
| OR | logical OR |
| NOT | logical NOT |
| XOR | logical exclusive OR |
| ANDFG | logical AND flags |
| ORFG | logical OR flags |
| NOTFG | logical NOT a flag |
| XORFG | logical exclusive OR flags |

Shift operation instructions

| | | |
|---|---|---|
| SRA | Shift right arithmetic | |
| SRAHp | Shift right arithmetic a half-word | p = L(0), H(1) |
| SRA2H | Shift right arithmetic two half-words | |
| SRC | Shift right concatenated registers | |
| SRL | Shift right logical | |
| SRLHp | Shift right logical a half-word | p = L(0), H(1) |
| SRL2H | Shift right logical two half-words | |
| ROT | Rotate right | |
| ROT2H | Rotate right two half-words | |

Bit operation instructions

| | |
|---|---|
| BCLR | Clear a bit |
| BNOT | Invert a bit |
| BSET | Set a bit |
| BTST | Test a bit |

Branch instructions

| | |
|---|---|
| BRA | Branch |
| BRATZR | Branch if zero |
| BRATNZ | Branch if not zero |
| BSR | Branch to subroutine |
| BSRTZR | Branch to subroutine if zero |
| BSRTNZ | Branch to subroutine if not zero |
| DBRA | Delayed Branch |
| DBRAI | Delayed Branch immediate |
| DBSR | Delayed Branch to subroutine |
| DBSRI | Delayed Branch immediate to subroutine |
| DJMP | Delayed Jump |
| DJMPI | Delayed Jump immediate |
| DJSR | Delayed Jump to subroutine |
| DJSRI | Delayed Jump immediate to subroutine |
| JMP | Jump |
| JMPTZR | Jump if zero |
| JMPTZN | Jump if not zero |
| JSR | Jump to subroutine |

-continued

| | |
|---|---|
| JSRTZR | Jump to subroutine if zero |
| JSRTNZ | Jump to subroutine if not zero |
| NOP | No operation |

OS-related instructions

| | |
|---|---|
| TRAP | Trap |
| REIT | Return from exception, interrupts, and traps |

DSP Arithmetic operation instructions

| | | |
|---|---|---|
| MUL | Multiply | |
| MULX | Multiply with extended precision | |
| MULXS | Multiply and shift to the left by one with extended precision | |
| MULX2H | Multiply two pairs of half-words with extended precision | |
| MULHXpp | Multiply two half-words with extended precision | |
| | pp = LL(00), LH(01), HL(10), HH(11) | |
| MUL2H | Multiply two pairs of half-words | |
| MACd | Multiply and add | (d = 0, 1) |
| MACSd | Multiply, shift to the left by one, and add | (d = 0, 1) |
| MSUBd | Multiply and subtract | (d = 0, 1) |
| MSUBSd | Multiply, shift to the left by one, and subtract | (d = 0, 1) |
| SAT | Saturate | |
| SATHH | Saturate word operand into high half-word | |
| SATHL | Saturate word operand into low half-word | |
| SATZ | Saturate into positive number | |
| SATZ2H | Saturate two half-words into positive number | |
| SAT2H | Saturate two half-word operands | |

Repeat instructions

| | |
|---|---|
| REPEAT | Repeat a block of instructions |
| REPEAT I | Repeat a block of instructions with immediate |

Debugger supporting instructions

| | |
|---|---|
| DBT | Debug trap |
| RDT | Return from debug interrupt and trap |

Figure 13:
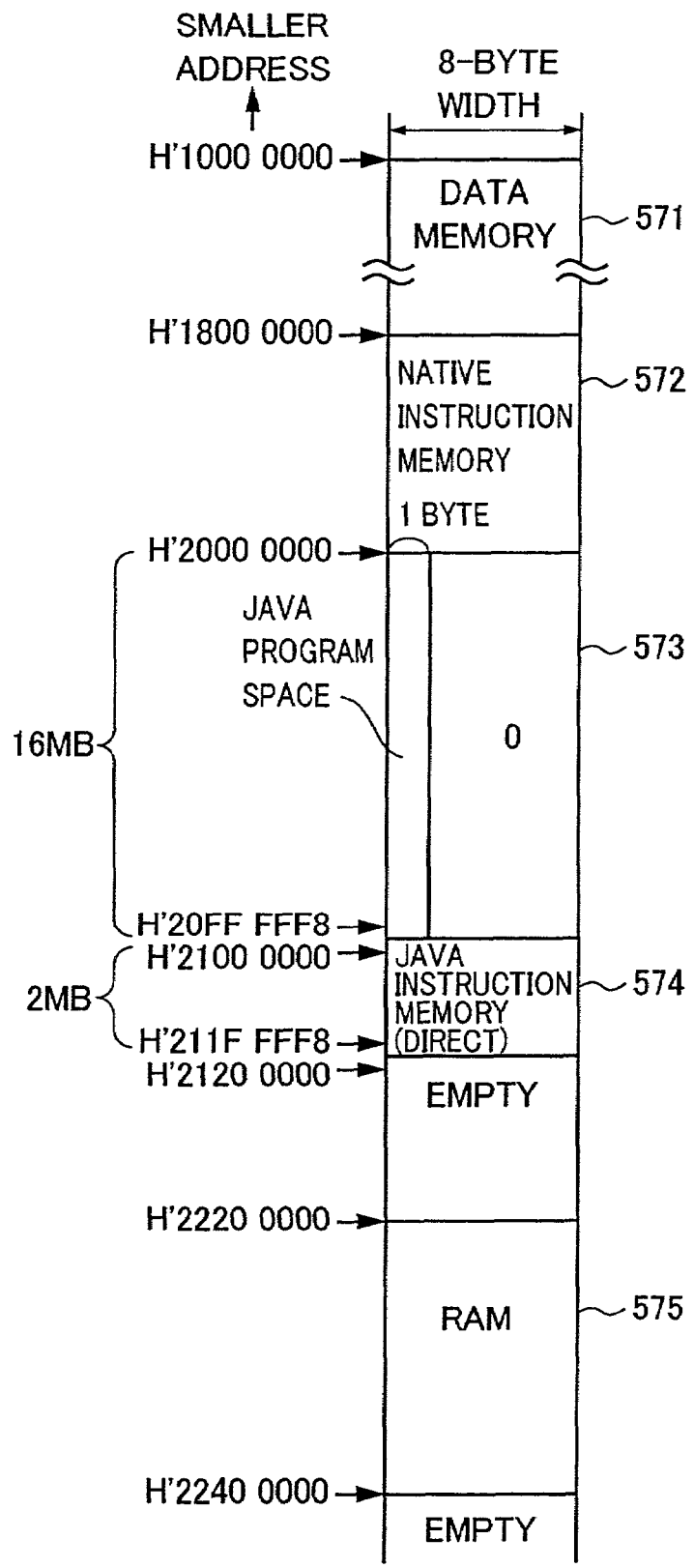
FIG. 13 shows a memory map of the data processing device shown in FIG. 2.

FIG. 13 shows an address map when processor 510 shown in FIG. 2 accesses each of external memories 520-523 via address bus 31, data bus 32 and control bus 33. As shown in FIG. 13, memories 520-522 are mapped into an address region 575 for RAM (H' 2220 0000-H' 223F FFF8), an address region 571 for the data memory (H' 1000 0000-H' 17FF FFF8) and an address region 572 for the native instruction memory (H' 1800 0000-H' 1FFF FFF8). Memory 523 is mapped into an address region 574 (H' 2100 0000-H' 211F FFF8) if the read/write are performed without translating the instruction codes, and is mapped into an address region 573 (H' 2000 0000-H' 20FF FFF8) if the read is performed together with translation of the instruction codes.

When viewed from processor 510, the address in memory 523 is equal to address regions 573 and 574 shown in FIG. 13. When accessing memory 523 in address region 574, the memory is present at all the byte positions in the space of 2 MB. When accessing memory 523 in address region 573, a valid memory is present in all the upper one bytes among each eight bytes aligned in the space of 16 MB, but the memory is not present in the lower seven bytes.

As is apparent from the contents already described with reference to FIG. 6, the external memory is accessed with the address aligned with four bytes boundary. Therefore, external data bus 32 has a 4-byte width (32-bit width). If one native instruction (VLIW instruction of 8 bytes) is read from instruction memory 522 by accessing an address region 572 or the like, the access for the native instruction is performed two times in a divided fashion. More specifically, the processor continuously outputs the address two times onto addresses bus 31, whereby data of 4 bytes is continuously received two times from data bus 32. Bus width changing circuit 560 assembles the two pieces of data of 4 bytes each received from signal line 541 of 4-byte width into the data of 8 bytes, and outputting it onto a signal line 563 of 8-byte width. Thus, bus width changing circuit 560 receives and temporarily holds the first data of 4 bytes from signal line 541, and then receives the second data of 4 bytes from signal line 541 to output data of 8 bytes, which is prepared by concatenating the first 4-byte data and the second data, as the native instruction.

Bus width changing circuit 561 has a similar function. More specifically, in the case where reading or writing data of 8 bytes by accessing address region 571 or the like, two pieces of 4-byte data each, which are received from signal line 562 of the 4-byte width by continuously performing two times the memory access, are output as one 8-byte data onto data bus 107. Further, one 8-bit data received from data bus 107 is divided into two pieces of 4-bit data, which are output onto data bus 32 via signal line 562 and selector 537 by continuously performing the memory access twice.

If data bus 32 is 64-bit width, bus width changing circuits 560 and 561 are not required. In this case, signal lines 541 and 563 may be directly connected. Likewise, signal line 562 and data bus 107 may be directly connected.

Processor 510 having the structure described above operates as follows. First, description will be given on the memory access, which is effected without HW translation on address spaces 571-572 and 574-575 for the instruction or data. Referring to FIG. 2, the signal on control bus 33 is used to assert the chip select signal of the memory to be accessed.

Selectors 535 and 538 shown in FIG. 6 select the signal on signal line 542 to output the lower 24 bits of the address onto address bus 31. At this time, selectors 536-538 are controlled depending on whether the access is for the instruction read, data read or data write, and thereby the connection relationship between instruction bus 105, data bus 107 and data bus 32 as well as the flow of data are controlled. As a result, the output of selector 537 is applied, instead of the output of translation circuit 540, to processor core 100 via signal line 105 as the selected instruction.

The instruction access is effected on an address space 573. In the case of the memory access with HW translation, control portion 532 controls translation circuit 540 and selectors 535 and 536 via signal line 546, and translates the JAVA byte codes fetched from memory 523 into the native instruction for outputting it onto instruction bus 105. In this operation, the address value, which is sent from instruction address bus 104 via selector 531 onto signal line 542, and is further input into address signal shift circuit 534, is shifted rightward by three bits by address signal shift circuit 534. Thus, the address value is divided by eight, is output onto signal line 545, and is input into translation circuit 540.

Referring to FIG. 7, address management circuit 554 of translation circuit 540 remaps the address values of address region 573, which are input via signal line 545, in address region 574, and output them onto signal line 544. The signal thus output is output onto address bus 31 via selector 538 shown in FIG. 6. As a result, memory 523 is accessed, and the JAVA byte codes are fetched.

The operation of translation circuit 540 in the above state will now be described specifically with reference to FIG. 7. Address management circuit 554 compares the address value input from signal line 545 with the last input address value, and determines whether the corresponding JAVA byte codes are present in input buffer memory 551 or not. If the corresponding JAVA byte code is present, that JAVA byte code is output to translator 552 via input buffer memory 551.

If the corresponding JAVA byte code is not present in input buffer memory 551, address management circuit 554 outputs a control signal onto control signal line 546. This control signal is used for access memory 523 using the address value of the lower 24 bits in address region 573 received via signal line 545 as the address value of the lower 24 bits in address region 574. For fetching the JAVA byte codes in units of aligned 4 bytes in the above operation, the lower 2 bits of the address value of 24 bits, which are output from address management circuit 554 onto signal line 544, is always 0 regardless of the input address value. This address value is selected by selector 538 as shown in FIG. 6, and is output onto address bus 31. Thereby, JAVA byte codes are fetched 4 bytes at a time from memory 523 via data bus 32 into input buffer memory 551.

Figure 14:
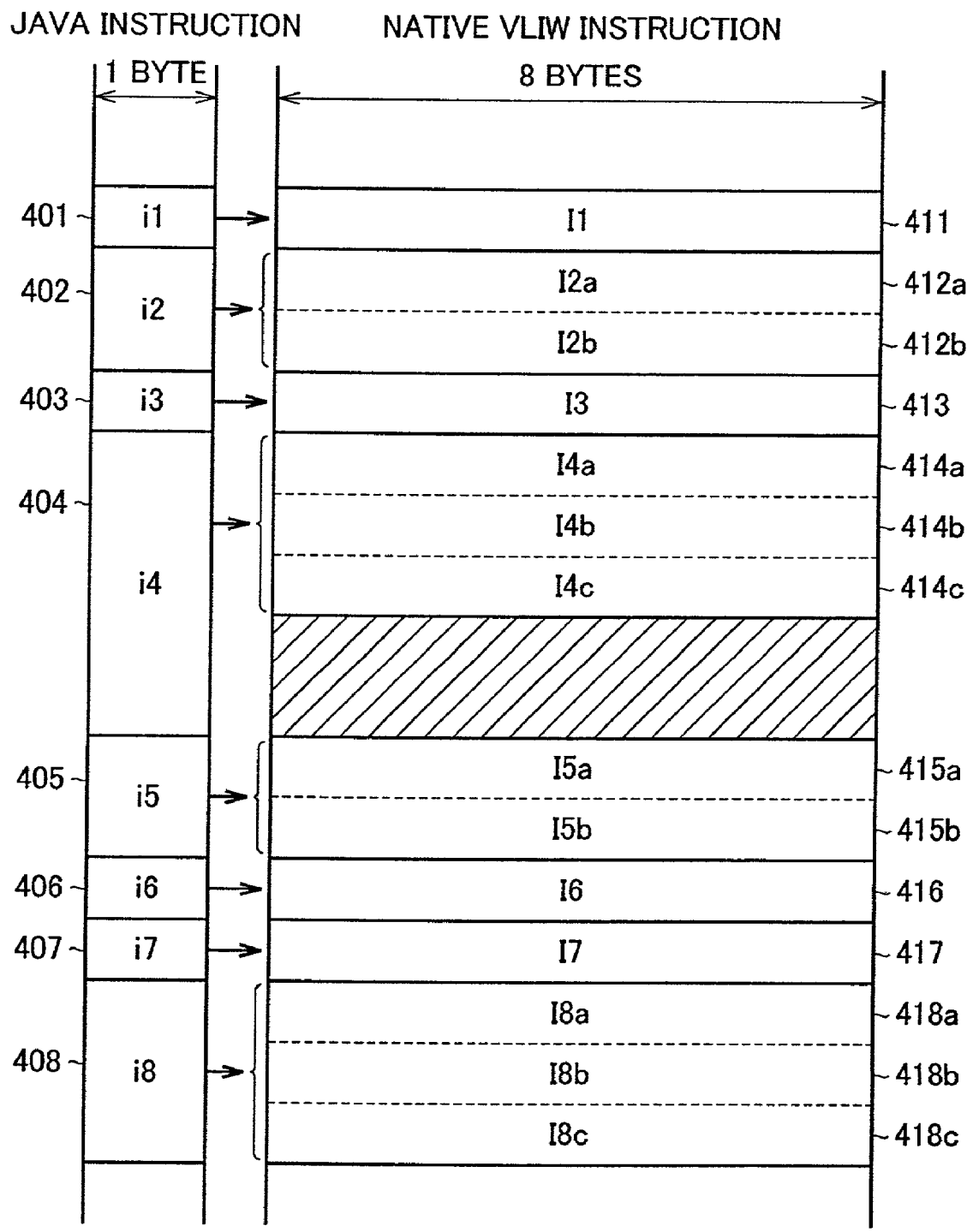
FIG. 14 shows a correspondence between instructions when translating the JAVA instruction into one or more VLIW instruction(s)

Referring to FIG. 14, the following relationship holds between the JAVA instructions translated by an instruction code translating portion 370 and the VLIW instructions. For example, a JAVA instruction 401 of 1 byte is translated into a VLIW instruction 411 of 8 bytes. Since JAVA instruction 401 is formed of one byte, JAVA instruction 401 can be read out by accessing JAVA instruction memory 523 only one time. Translated VLIW instruction 411 is output onto signal line 539 via output buffer 553. In this case, selector 536 selects the instruction on signal line 539 and applies the same to processor core 100 because the address is within address region 573.

A JAVA instruction 402 of 2 bytes is translated into two 8-byte VLIW instructions 412a and 412b. A JAVA instruction 404 of 5 bytes is translated into three 8-byte VLIW instructions 414a, 414b and 414c. JAVA instruction 403, 406-408 and others are translated similarly. JAVA instruction 403 is translated into VLIW instruction 413, JAVA instructions 406 is translated into VLIW instruction 416, JAVA instruction 440 is translated into VLIW instruction 417, and JAVA instruction 408 is translated into three 8-byte VLIW instructions 418a-418c.

Figure 15:
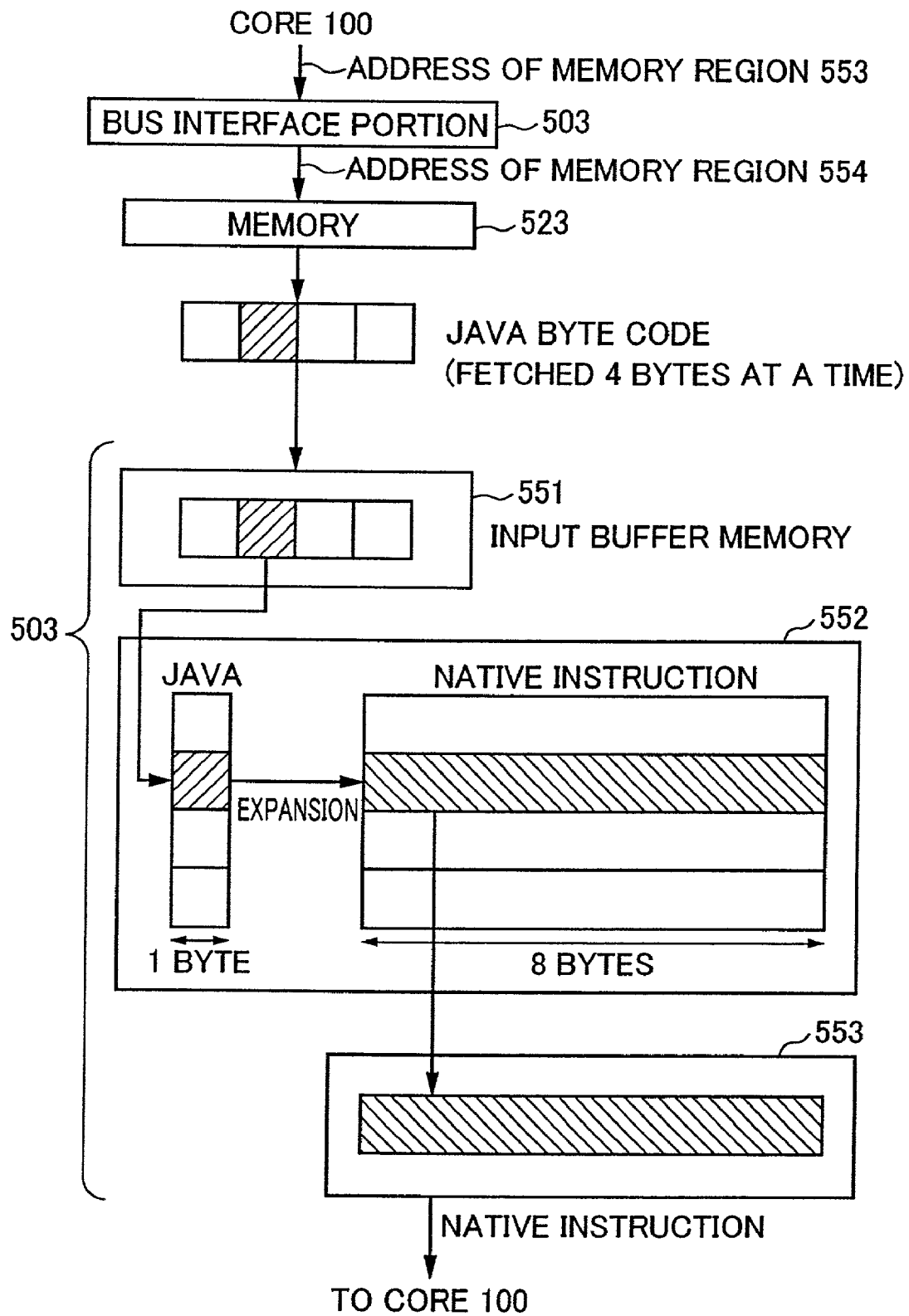
FIG. 15 shows a flow of data occurring when JAVA byte codes are fetched from a memory 523, are translated into native instructions and are transferred to a core 100.

FIG. 15 shows a flow of data occurring when core 100 sends an instruction access request with an address of memory region 573, memory 523 is accessed and the JAVA byte code is fetched, is translated into the native instruction and is transferred to core 100. Whenever core 100 accesses memory region 573, this is always the fetch of the native instruction. Therefore, core 100 always outputs the address, which is aligned to 8 bytes border, to bus interface portion 503.

The address of memory region 573 is output as the address of memory region 574 by bus interface portion 503, and thereby memory 523 is accessed. Memory region 573 is a virtual JAVA byte code region. Therefore, the JAVA byte code (nonnative instruction), which is fetched by accessing actual memory 523, is translated into native instruction by bus interface portion 503, and is transferred via bus 105 to core 100. Thus, the native instruction of 16 MB of memory region 573 is compressed into ⅛, when viewed from core 100, and is held in memory 523 as the JAVA byte code of 2 MB of memory region 574. The JAVA byte code, which is fetched four bytes at a time by interface portion 503 from memory 523, is temporarily stored in input buffer 551, and then is read from input buffer 551 to translator 552 for translation into the native instruction. Then, the native instruction thus prepared is output to core 100 via output buffer memory 553. In this manner, a function of translating the instruction code is achieved.

When accessing address region 574, processor 510 can use the JAVA byte code stored in JAVA instruction memory 523 as data for the access operation. Therefore, the address designating the JAVA byte code to be fetched is transferred via data address bus 106 onto address bus 31, and the JAVA byte code is transferred via data bus 32 from memory 523 to data bus 107. Processor 510 can execute the JAVA byte code fetched as data by using software, which is called "software interpreter"

and is written in native instructions. Alternatively, processor 510 can execute the JAVA byte code fetched as data after translating it into the native instructions by using software, which is called "software translator", and is described in native instructions. Accordingly, processor 501 of this embodiment is supported such that it can execute the program written in nonnative instructions such as JAVA byte code in any one of the manners of using the hardware translator, software translator and software interpreter.

A study relating to a standard or criterion, on which the processor selects one of the hardware translator, software translator and software interpreter for executing the JAVA byte code, has been described, e.g., in Japanese Patent Laying-Open No. 2000-368729 filed on Dec. 4, 2000 by the same assignee.

FIGS. 16-21 show specific examples of translation of JAVA instruction into VLIW instruction by a translator 372. The technology relating to the JAVA instruction has been described in many books, and reference may be made to such books for more information.

Figure 16:
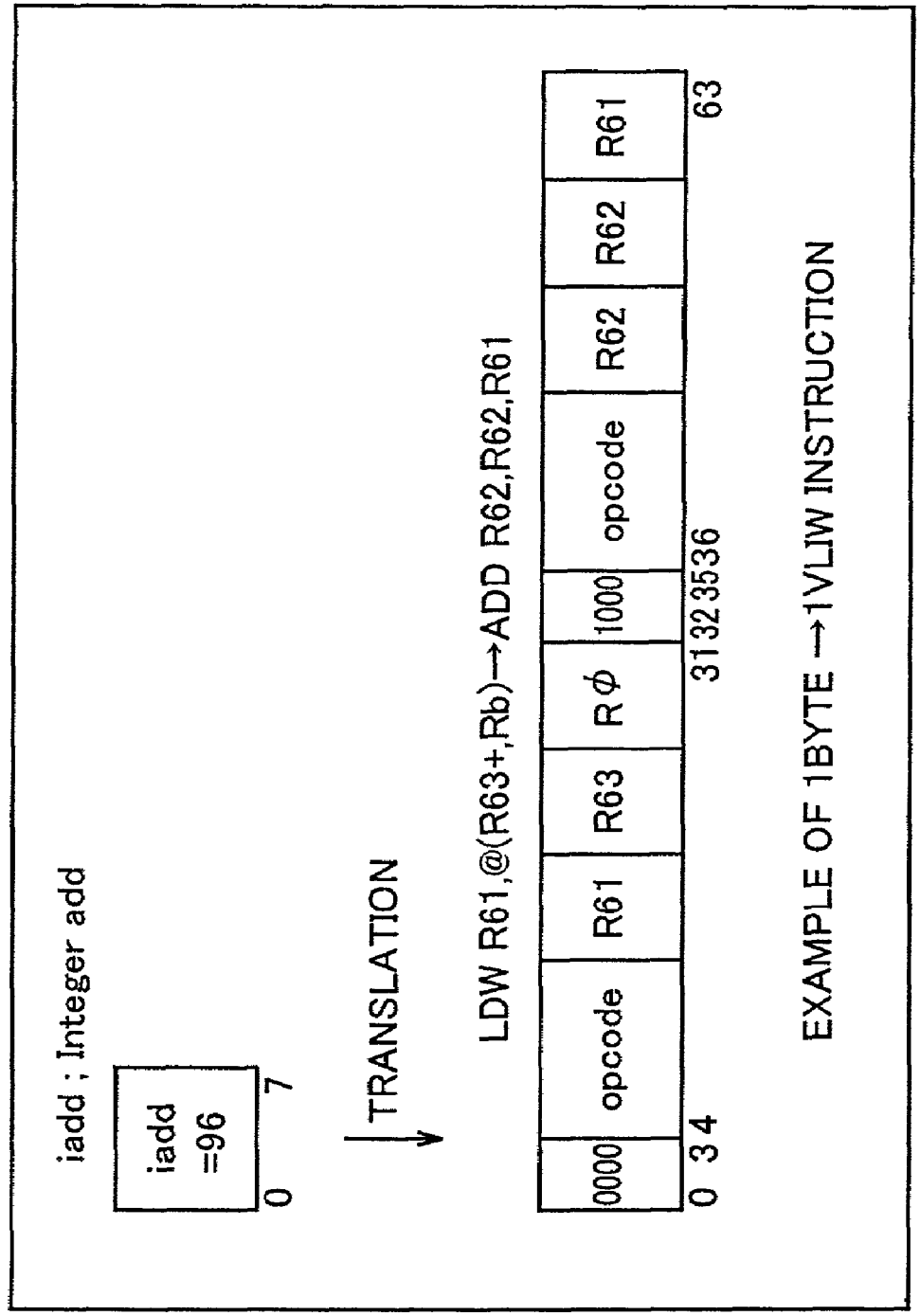
FIGS. 16 to 21 show specific examples of translation of JAVA instructions into VLIW instructions.

Referring to FIG. 16, JAVA instruction "iadd" of 1 byte is translated into one VLIW instruction for successively executing sub-instruction "LDW R61, @(R63+, R0) and sub-instruction "ADD R62, R62, R61". The instruction "iadd" is a JAVA instruction for adding two 32-bit integers, which are the first and second data counted from the stack top, and rewriting the result on the same stack. In processor 510, the data at the stack top is arranged in register R62, and register R63 represents the address of the next data counted from the stack top. In processor 510, therefore, the operation of JAVA instruction "iadd" can be emulated by the sub-instruction "LDW R61, @(R63+, R0)" for performing the operation of loading the 32-bit data in the second position counted from the stack top into register R61, and incrementing register R63 by four, and the sub-instruction "ADD R62, R62, R61" for performing the operation of adding the two 32-bit integers of registers R62 and R61, and writing the result of addition into register R62. For the PC value in the above case, the PC value of processor 510 is advanced by 8 addresses as a result of executing one VLIW instruction, whereby the emulation is performed to advance the PC value by one in accordance with the execution of JAVA instruction "iadd".

Figure 17:
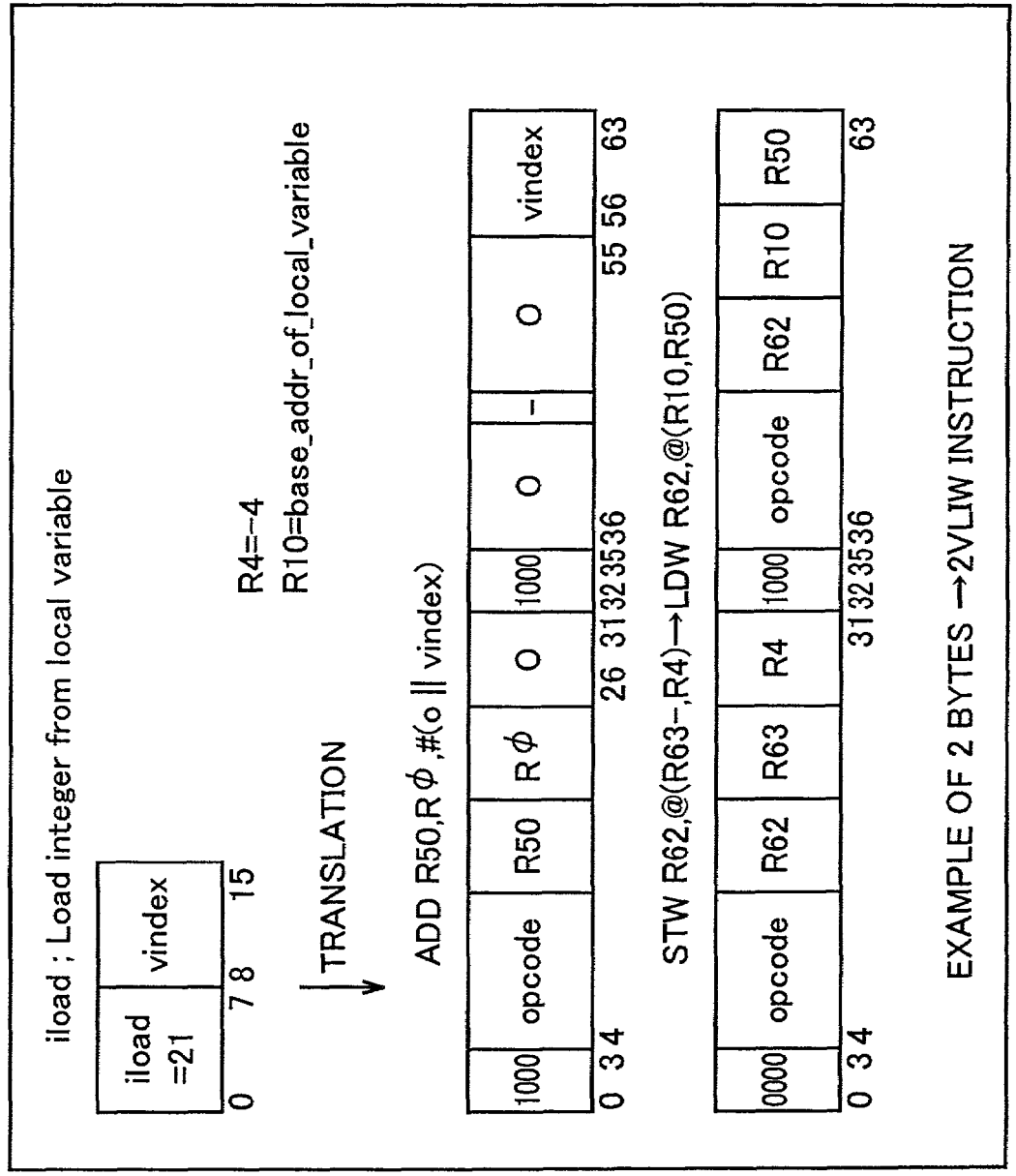

Referring to FIG. 17, JAVA instruction "iload" of 2 bytes is translated into the VLIW instruction having one sub-instruction "ADD/CN R50, #(0||vindex)" and the VLIW instruction for successively executing sub-instruction "STW R62, @(R63−, R4)" and sub-instruction "LDW R62, @(R10, R50)". The instruction "iload" is a JAVA instruction for fetching a 32-bit integer from the local variable region, and holding it on the stack top. Processor 510 performs the simulation by decomposing this instruction into sub-instruction "ADD/CN R50, #(0||vindex)" for loading the index value of the local variable into register R50, sub-instruction "STW R62, @(R63−, R4)" for pushing register R62 to the second position counted from the stack top, and sub-instruction "LDW R62, @(R10, R50)" for loading data from the local variable region into register R62 on the stack top.

Register R4 holds a value "−4", and register R10 holds the base address of the local variable region. For the PC value, the PC value of processor 510 is advanced by 16 addresses as a result of execution of the two VLIW instructions, whereby simulation of advancing the PC value by two addresses in accordance with the execution of JAVA instruction "iload" is performed.

Figure 18:
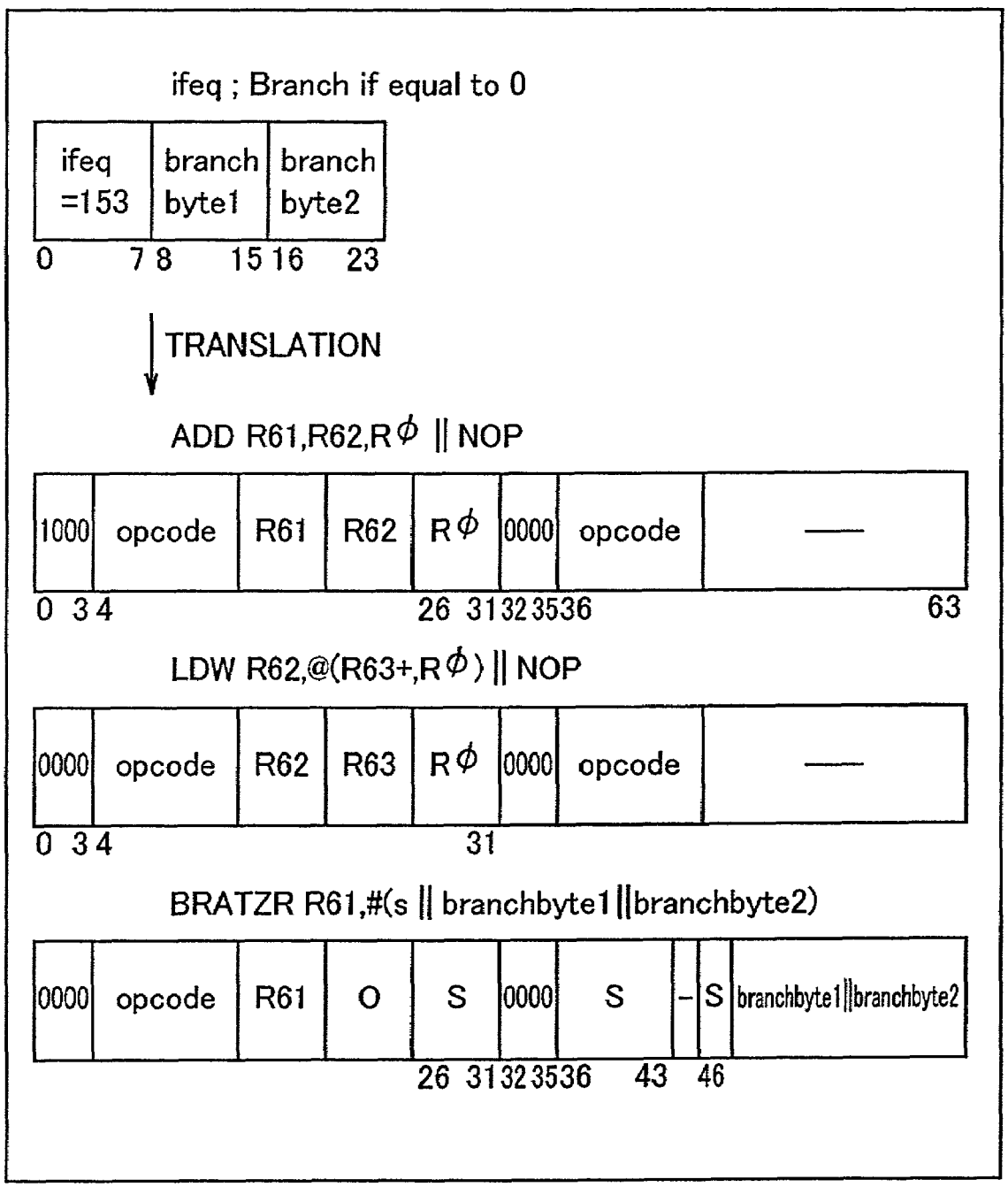

Referring to FIG. 18, a JAVA instruction "ifeq" of 3 bytes is decomposed into a VLIW instruction for executing sub-instruction "ADD R62, R61, R0" and sub-instruction "NOP" in parallel, a VLIW instruction for executing sub-instruction "LDW R62, @(R63+, R0)" and sub-instruction "NOP" in parallel, and a VLIW instruction for executing one sub-instruction "BRATZR/CN R61, #(s||branchbyte1||branchbyte2|)". Instruction "ifeq" is a JAVA instruction, which branches if the data on the stack top is "0". Processor 510 decomposes this into sub-instruction "ADD R62, R61, R0" for copying register R62 to register R61, sub-instruction "LDW R62, @(R63+, R0)" for popping the data in the second position counted from the stack top to register R62, and sub-instruction "BRATZR/CN R61, #(s||branchbyte1||branchbyte2)", which branches if register R61 is zero, and combines these three sub-instructions with two NOP instructions for performing simulation with the VLIW instructions of three in total number. The PC value of processor 510 is advanced by 24 addresses as a result of executing the three VLIW instructions, whereby the operation of advancing the PC value by three addresses in accordance with the execution of JAVA instruction "ifeq" is simulated.

Figure 19:
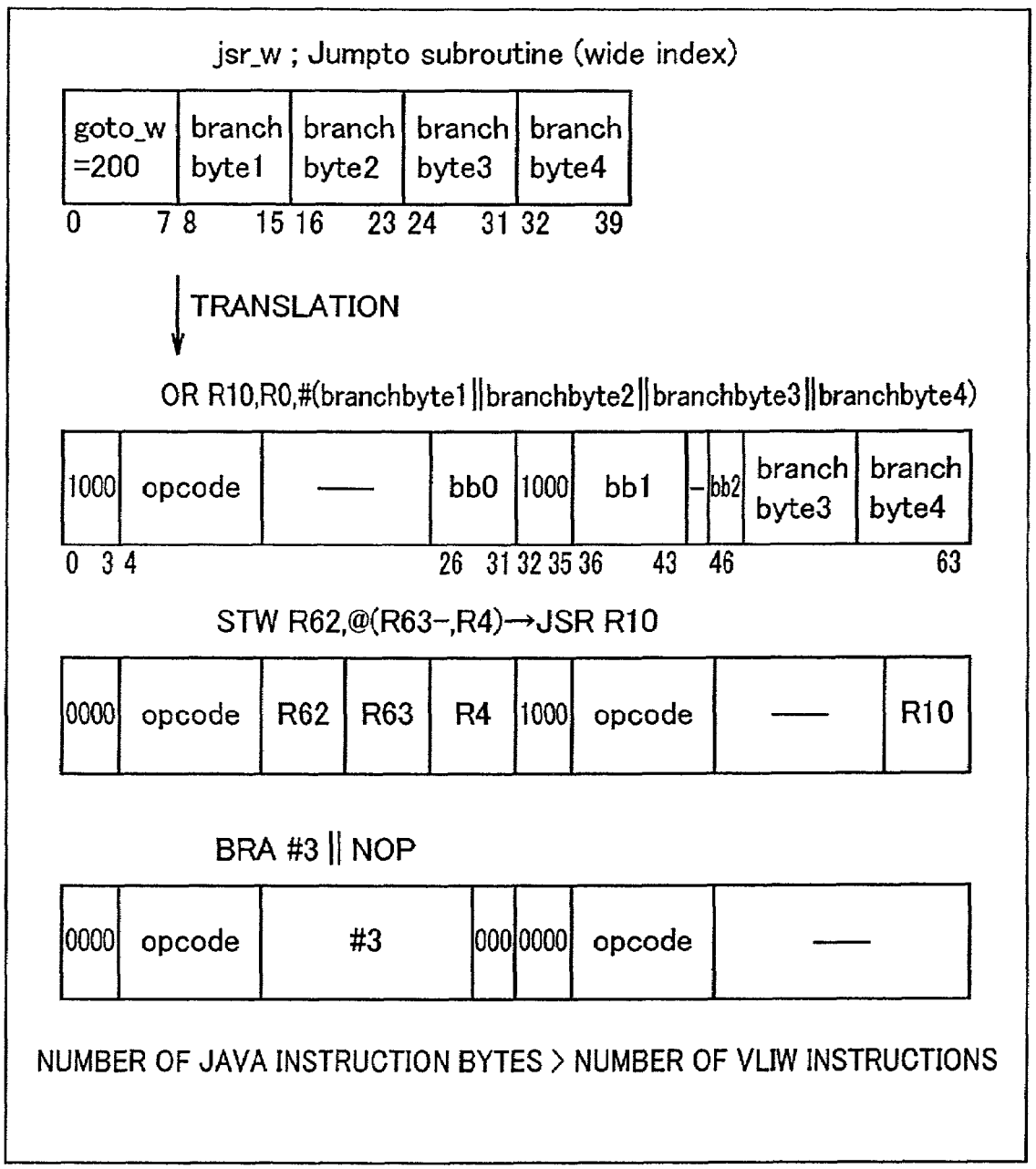

Referring to FIG. 19, a JAVA instruction "jsr_w" of 5 bytes is translated into a VLIW instruction formed of one sub-instruction "OR R10, #(branchbyte1|| branchbyte2|| branchbyte3||branchbyte4)", a VLIW instruction for successively executing sub-instruction "STW R62, @ (R63−, R4) and sub-instruction "JSR R10", and a VLIW instruction for executing in parallel sub-instruction "BRA #3" and sub-instruction "NOP". JAVA instruction "jsr_w" is an instruction for pushing a return address to the stack, and jumping to the subroutine of the address designated by 4 bytes. Processor 510 performs the simulation by decomposing the above instruction into sub-instruction "OR R10, #(branchbyte1||branchbyte2||branchbyte3||branchbyte4) for loading the jump address to register R10, sub-instruction " STW R62, @(R63−, R4) for storing the value of register R62 to the second position counted from the stack top, sub-instruction "JSR R10" for storing the return address in register R62 on the stack top, and jumping to the subroutine at the address designated by register R10, sub-instruction "BRA #3" for performing branching for skipping the two VLIW instructions after returning from the subroutine, and sub-instruction "NOP".

For the PC value, the three VLIW instructions are executed, and the branching for skipping the two VLIW instructions is performed, whereby the PC value of processor 510 is advanced by 40 addresses so that the operation of advancing the PC value by 5 addresses in accordance with execution of JAVA instruction "jsr_w" is simulated.

Figure 20:
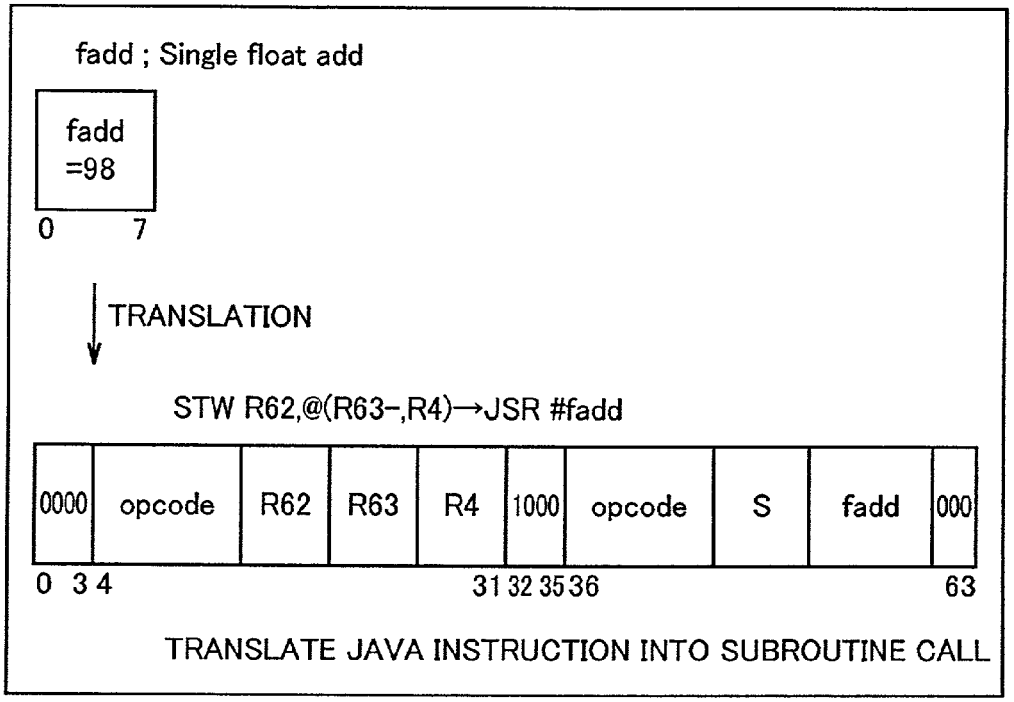
Figure 21:
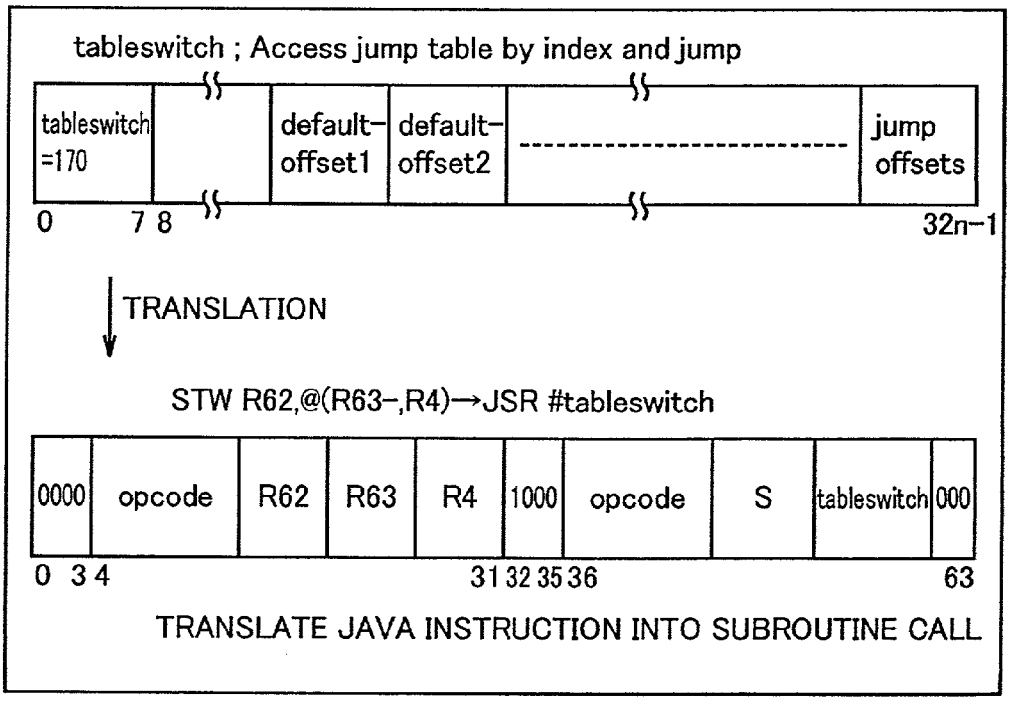

FIGS. 20 and 21 show examples of translating complicated JAVA instructions into VLIW instructions, which are formed of VLIW instructions, and call the subroutines for executing the function of JAVA instruction. In the example shown in FIG. 20, a JAVA instruction "fadd" for adding floating-point numbers is translated into a VLIW instruction for successively executing sub-instruction "STW R62, @(R63−, R4)" for storing the value of register R62 to the second position counted from the stack top, and sub-instruction "JSR #fadd" for storing the return address in register R62 on the stack top, and jumping to the subroutine at the address designated by #fadd. Processor 510 performs the operation of "fadd" in the sub-routine, and performs the operation relating to update of the PC value in such a manner that advancing of the PC value corresponding to "fadd" by one address is simulated by executing one VLIW instruction to advance the PC value of processor 510 by eight addresses.

In the example shown in FIG. 21, a JAVA instruction "tableswitch" for performing table jump is translated into a VLIW instruction for successively executing sub-instruction "STW R62, @(R63–, R4)" for the value of register R62 to the second position counted from the stack top storing, and sub-instruction "JSR #tablesswitch" for storing the return address in the register R62 on the stack top, and jumping to a sub-routine at the address designated by #tablesswitch. In processor 510, the operation of "tableswitch" and the update of PC value are both simulated by accessing various parameters designed by JAVA instruction "tableswitch" in the sub-routines. In this operation, processor 510 accesses a memory 25 provided with translator for JAVA instructions in an address region 125a for JAVA instructions (i.e., directly coupled address region), and reads out various parameters designated by JAVA instruction "tableswitch".

According to the embodiment of the invention, the program including the nonnative and native instruction processing routines in a mixed fashion can be executed fast. Even if the instruction length of the nonnative instruction is different from that of the native instruction, the processor core is not required to recognize the difference in instruction length, and the device can execute the program including the nonnative and native instruction processing routines in a mixed fashion.

Further, only a simple circuit is required to perform the address conversion for fetching the nonnative instruction if the instruction length of the nonnative instruction is equal to a value obtained by dividing the instruction length of the native instruction by n-th power of 2. The address conversion for fetching the nonnative instruction can be performed by a very simple circuit.

The processor core having the above memory interface executes the instruction in a simple manner without determining whether the instruction to be executed is native or nonnative, and thereby can execute the program including the nonnative and native instruction processing routines in a mixed fashion. Since only the native instructions are used within the processor core, the execution in the processor core can be fast. Even if the nonnative and native instructions have different instruction lengths, the processor core is not required to recognize the difference in instruction length, and can execute the program including the processing routines of the nonnative and native instructions in a mixed fashion without changing the structure of the processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device with an instruction translator comprising:
   a processor core; and
   a memory interface portion arranged between said processor core and an external memory mapped into a predetermined external memory space,
   said memory interface portion including a fetch circuit for receiving an address value for access to said external memory space from said processor core, and fetching information at said address in said external memory, said information being an instruction nonnative to said processor, an instruction native to said processor or data to be processed;
   a translator for translating the instruction nonnative to said processor core fetched by said fetch circuit from said external memory into the native instruction; and
   a select circuit for selectively applying the information read from said external memory space and the instruction prepared by translating the instruction read from said external memory space by said translator to said processor core depending on whether the address value for the access from said processor core to said external memory space is in a predetermined region or not, wherein
   a bus width of an instruction bus in said processor core is different from a bus width of a data bus of said external memory; and
   said select circuit includes:
   a bus width changing circuit having an input connected to said external memory and an output of a same width as the bus width of the instruction bus of said processor for performing conversion between the bus width of the data bus of said external memory and the bus width of the instruction bus in said processor, and outputting a result, and
   a multiplexer having inputs connected to the outputs of said bus width changing circuit and said translator, respectively, and an output connected to said instruction bus of said processor core for selectively applying to said processor core an instruction output from said bus width changing circuit and an instruction output from said translator, depending on whether the address value for the access from said processor core to said external memory space is within a predetermined region or not.

2. The data processing device with the instruction translator according to claim 1, wherein
   said fetch circuit includes:
   an address conversion circuit for effecting predetermined conversion on the address for the access from said processor core to said external memory core, and
   a circuit for selectively applying the address sent from said processor core and the address output from said address conversion circuit to said external memory depending on whether said address is within said predetermined region or not.

3. The data processing device with the instruction translator according to claim 2, wherein
   said conversion circuit includes a division circuit for dividing the input address value by n-th (n: natural number) power of 2 and outputting a result.

4. The data processing device with the instruction translator according to claim 3, wherein
   said division circuit includes a shifter for shifting rightward the input address value by n bits.

5. The data processing device with the instruction translator according to claim 1, wherein
   said processor core has an instruction bus, an instruction address bus, a data bus and a data address bus, and
   said data processing device further includes:
   a second multiplexer having inputs connected to said instruction address bus and said data address bus, respectively, for selecting said instruction address bus or said data address bus for application to said fetch circuit in response to a control signal applied from said processor core, and
   a third multiplexer for electrically coupling said memory bus to said instruction bus or said data bus, in response to said control signal applied from said processor core.

6. A memory interface device with instruction translator to be arranged between a processor core and an external memory mapped into a predetermined external memory space, comprising:
   a fetch circuit for receiving an address value for access to said external memory space from said processor core, and fetching information at said address in said external memory, said information being an instruction nonnative to said processor, an instruction native to said processor, or data to be processed;

a translator for translating the instruction nonnative to said processor core fetched by said fetch circuit from said external memory into the instruction native to said processor; and a select circuit for selectively applying the information read from said external memory space and the instruction prepared by translating the instruction read from said external memory space by said translator to said processor core depending on whether the address value for the access from said processor core to said external memory space is in a predetermined region or not, wherein a bus width of an instruction bus in said processor core is different from a bus width of a data bus of said external memory; and said select circuit includes;

a bus width changing circuit having an input connected to said external memory and an output of a same width as the bus width of the instruction bus of said processor, for performing conversion between the bus width of the data bus of said external memory and the bus width of the instruction bus in said processor, and outputting a result, and a multiplexer having inputs connected to the outputs of said bus width changing circuit and said translator, respectively, and an output connected to said instruction bus of said processor core for selectively applying to said processor core an instruction output from said bus width changing circuit and an instruction output from said translator depending on whether the address value for the access from said processor core to said external memory space is within a predetermined region or not.

7. The memory interface device with the instruction translator according to claim 6, wherein said fetch circuit includes:

an address conversion circuit for effecting predetermined conversion on the address for the access from said processor core to said external memory core, and a circuit for selectively applying the address sent from said processor core and the address output from said address conversion circuit to said external memory depending on whether said address is within said predetermined region or not.

8. The memory interface device with the instruction translator according to claim 7, wherein said conversion circuit includes a division circuit for dividing the input address value by n-th (n: natural number) power of 2 and outputting a result.

9. The memory interface device with the instruction translator according to claim 8, wherein said division circuit includes a shifter for shifting rightward the input address value by n bits.

10. The memory interface device with the instruction translator according to claim 6, wherein said processor core has an instruction bus, an instruction address bus, a data bus and a data address bus, and said data processing device further includes:

a second multiplexer having inputs connected to said instruction address bus and said data address bus, respectively, for selecting said instruction address bus or said data address bus for application to said fetch circuit in response to a control signal applied from said processor core, and a third multiplexer for electrically coupling said memory bus to said instruction bus or said data bus in response to said control signal applied from said processor core.

11. A data reading method for reading information from an external memory mapped into a predetermined external memory space to a processor core, comprising the steps of:

receiving an address value for access from said processor core to said external memory space, and fetching the information at said address in said external memory, said data being an instruction nonnative to said processor, an instruction native to said processor, or data to be processed;

translating the instruction normative to said processor core fetched from said external memory into the instruction native to the processor; and selectively applying the information read from said external memory space and the instruction prepared by the translation of the instruction read from said external memory space to said processor core depending on whether the address value for the access from said processor core to said external memory space is in a predetermined region or not, wherein a bus width of an instruction bus in said processor core is different from a bus width of a data bus of said external memory; and said selectively applying step includes the steps of:

changing the data width of a fetched information by said external memory to the bus width of the instruction bus within said processor core, and selectively applying to said processor core the information having the changed bus width and the translated native instruction depending on whether the address value for the access from said processor core to said external memory space is within a predetermined region or not.

12. The data reading method according to claim 11, wherein said fetching step includes the steps of:

effecting predetermined conversion on the address for the access from said processor core to said external memory core, and selectively applying the address sent from said processor core and the address subjected to said predetermined conversion to said external memory depending on whether said address is within said predetermined region or not.

13. The data reading method according to claim 12, wherein said converting step includes a step of dividing the input address value by n-th (n: natural number) power of 2 and outputting a result.

14. The data reading method according to claim 13, wherein said dividing and outputting step includes a step of shifting rightward the input address value by n bits.

15. The data reading method according to claim 11, wherein said processor core has an instruction bus, an instruction address bus, a data bus and a data address bus, and said data reading method further includes the steps of:

selecting the address on said instruction address bus or the address on said data address bus for inputting the selected address to said fetching step in response to a control signal applied from said processor core, and electrically coupling said memory bus to said instruction bus or said data bus in response to said control signal applied from said processor core.

* * * * *

UNITED STATES PATENT AND TRADEMARK OFFICE
CERTIFICATE OF CORRECTION

PATENT NO. : 7,613,903 B2  Page 1 of 1
APPLICATION NO. : 09/911739
DATED : November 3, 2009
INVENTOR(S) : Toyohiko Yoshida It is certified that error appears in the above-identified patent and that said Letters Patent is hereby corrected as shown below:

On the Title Page of the patent, in Item "(73) Assignee:" change

"Renesas Technology Corporation" to --Renesas Technology Corp.--

In Column 18, Line 24 (Claim 11), change "changing the data" to

--changing a data--.

Signed and Sealed this

Twenty-third Day of March, 2010

David J. Kappos
*Director of the United States Patent and Trademark Office*